(12) United States Patent
Naito

(10) Patent No.: US 7,508,439 B2
(45) Date of Patent: Mar. 24, 2009

(54) DIGITAL CAMERA HAVING A MOVABLE IMAGE DISPLAY SCREEN

(75) Inventor: Yoshitaka Naito, Ome (JP)

(73) Assignee: Olympus Corporation, Tokyo (JP)

( * ) Notice: Subject to any disclaimer, the term of this patent is extended or adjusted under 35 U.S.C. 154(b) by 821 days.

(21) Appl. No.: 10/990,044

(22) Filed: Nov. 16, 2004

(65) Prior Publication Data

US 2005/0068443 A1 Mar. 31, 2005

(30) Foreign Application Priority Data

| Nov. 21, 2003 | (JP) | ............................ 2003-393006 |
| Dec. 5, 2003 | (JP) | ............................ 2003-407263 |
| Apr. 16, 2004 | (JP) | ............................ 2004-121826 |

(51) Int. Cl.
*H04N 5/222* (2006.01)

(52) U.S. Cl. ............................ 348/333.06; 348/333.01; 348/14.07

(58) Field of Classification Search ............ 348/333.06, 348/14.07, 333.01
See application file for complete search history.

(56) References Cited

U.S. PATENT DOCUMENTS

| 5,592,224 | A | * | 1/1997 | Shim ...................... 348/333.06 |
| 5,959,671 | A | * | 9/1999 | Etoh et al. ................... 348/373 |
| 6,295,088 | B1 | * | 9/2001 | Tsukahara et al. ...... 348/333.06 |
| 6,459,857 | B2 | * | 10/2002 | Kawamura et al. ........... 396/374 |
| 6,693,665 | B1 | * | 2/2004 | Shindo et al. ............. 348/207.2 |
| 6,812,971 | B2 | * | 11/2004 | Terane ......................... 348/375 |
| 7,170,557 | B2 | * | 1/2007 | Manico et al. ......... 348/333.07 |
| 7,202,901 | B1 | * | 4/2007 | Hattori et al. .......... 348/333.06 |
| 7,286,181 | B2 | * | 10/2007 | Cha ............................ 348/373 |
| 2001/0005454 | A1 | * | 6/2001 | Nishino et al. .............. 396/287 |
| 2002/0071035 | A1 | * | 6/2002 | Sobol ........................ 348/207 |
| 2002/0181722 | A1 | * | 12/2002 | Hibino et al. ................. 381/92 |
| 2003/0040346 | A1 | * | 2/2003 | Fukuda et al. .............. 455/575 |
| 2003/0156200 | A1 | * | 8/2003 | Romano et al. ........ 348/207.99 |

(Continued)

FOREIGN PATENT DOCUMENTS

JP 4-100382 4/1992

(Continued)

OTHER PUBLICATIONS

Chinese Office Action to Chinese Patent Application No. 2004100957724, dated Apr. 4, 2008 (7 pgs.) with translation (5 pgs.).

(Continued)

*Primary Examiner*—David L Ometz
*Assistant Examiner*—Usman Khan
(74) *Attorney, Agent, or Firm*—Straub and Pokotylo; John C. Pokotylo

(57) ABSTRACT

Disclosed is a digital camera which does not need a dedicated exclusive lens barrier and permits use in compact states in normal photography. The digital camera comprises a camera body, a photographing lens which is provided on the front side of the camera body, an image display unit which displays taken images, and a movable unit which moves the image display unit between the front and rear positions of the camera body. The image display unit is set so that when moved to the front position, the display panel faces the front side of the camera body just like covering the photographing lens, and when moved to the rear position, the display panel is exposed.

24 Claims, 20 Drawing Sheets

U.S. PATENT DOCUMENTS

| | | | |
|---|---|---|---|
| 2003/0214602 A1* | 11/2003 | Battles et al. | 348/375 |
| 2003/0218681 A1* | 11/2003 | Manico et al. | 348/333.06 |
| 2003/0228847 A1* | 12/2003 | Matsumoto | 455/90.3 |
| 2004/0004667 A1* | 1/2004 | Morikawa et al. | 348/333.06 |
| 2004/0070681 A1* | 4/2004 | Battles et al. | 348/333.01 |
| 2004/0169327 A1* | 9/2004 | Swayze et al. | 271/145 |
| 2005/0101358 A1* | 5/2005 | Carpenter | 455/575.1 |

FOREIGN PATENT DOCUMENTS

| | | | |
|---|---|---|---|
| JP | 8-9213 | | 1/1996 |
| JP | 8-331424 | | 12/1996 |
| JP | 08331424 A | * | 12/1996 |
| JP | 10-191117 | | 7/1998 |
| JP | 10-301162 | | 11/1998 |
| JP | 11-258657 | | 9/1999 |
| JP | 2000-050117 | | 2/2000 |
| JP | 2000075363 A | * | 3/2000 |
| JP | 2000-165719 | | 6/2000 |
| JP | 2003-086965 | | 3/2003 |
| JP | 2005167899 A | * | 6/2005 |
| JP | 2006138959 A | * | 6/2006 |

OTHER PUBLICATIONS

Notification of Reasons For Rejection for Japanese Patent Application No. 2003-407263, mailed Dec. 16, 2008 (3 pgs.) with translation (4 pgs.).

* cited by examiner

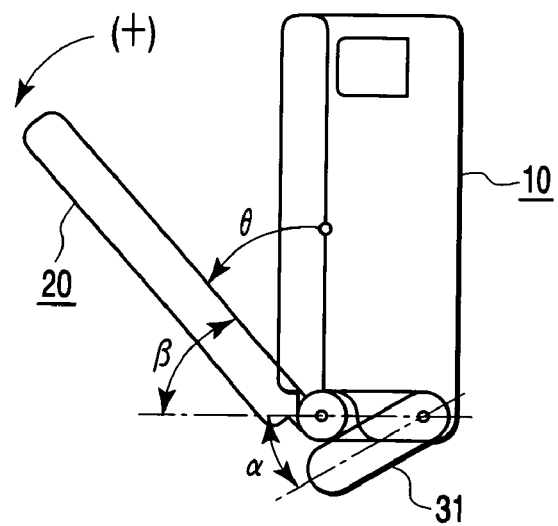
FIG. 5
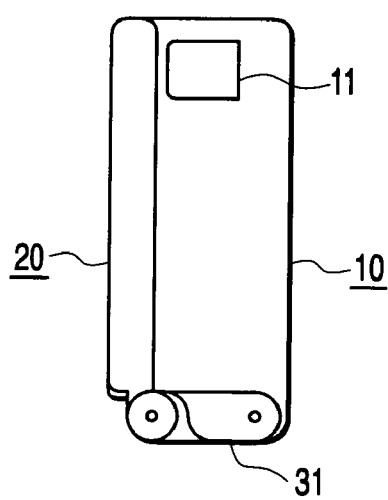 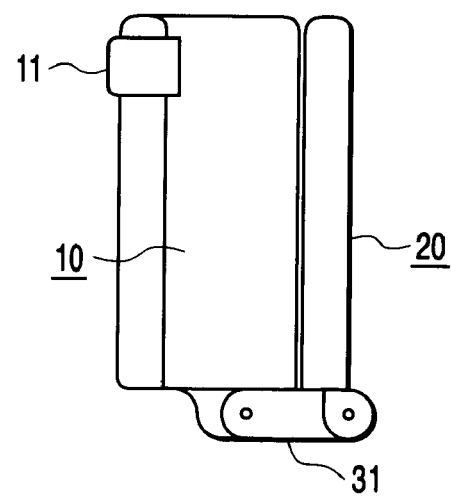
FIG. 6A    FIG. 6B

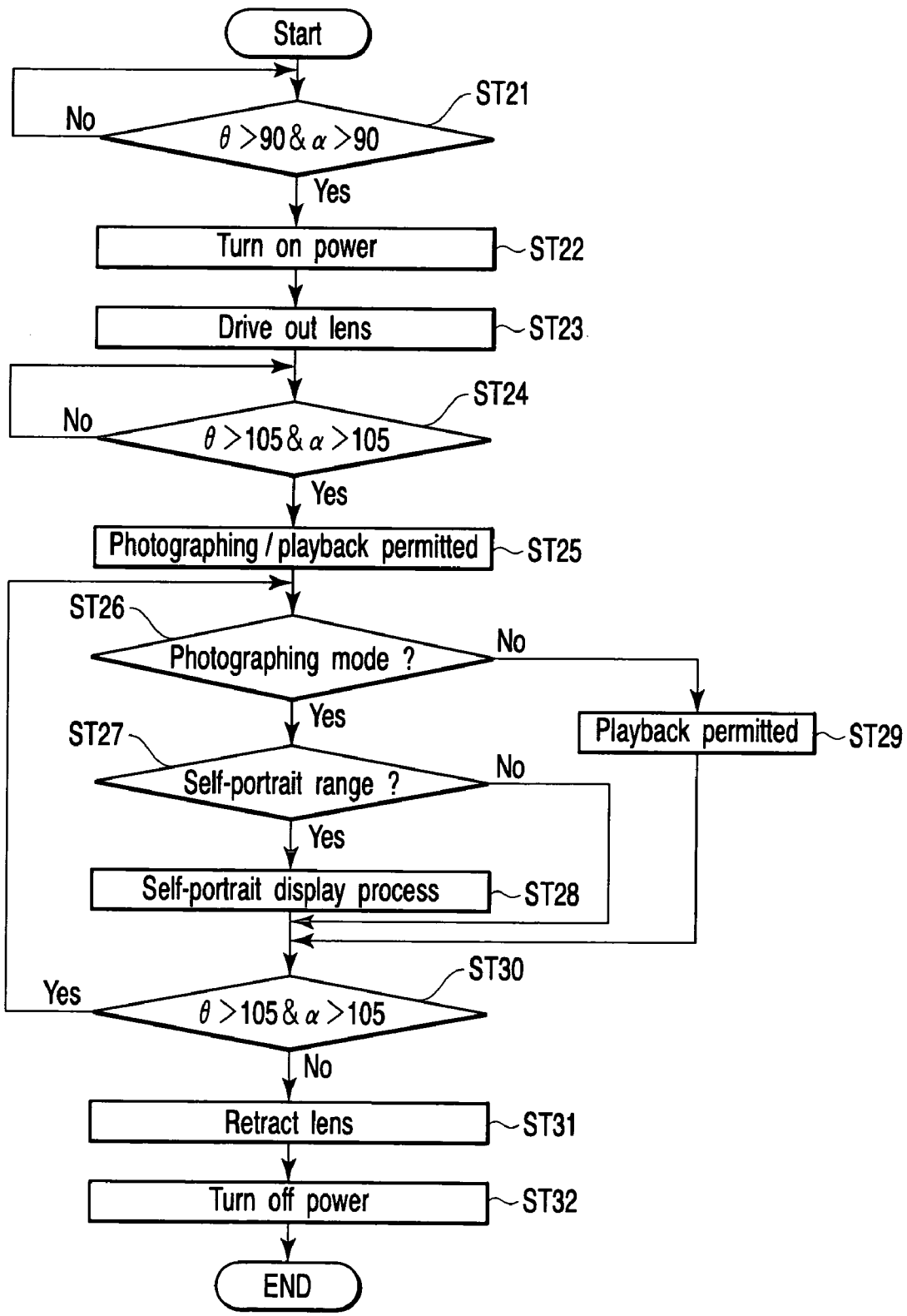
F I G. 2 4

DIGITAL CAMERA HAVING A MOVABLE IMAGE DISPLAY SCREEN

CROSS-REFERENCE TO RELATED APPLICATIONS

This application is based upon and claims the benefit of priority from prior Japanese Patent Applications No. 2003-393006, filed Nov. 21, 2003, No. 2003-407263, filed Dec. 5, 2003; and No. 2004-121826, field Apr. 16, 2004, the entire contents of all of which are incorporated herein by reference.

BACKGROUND OF THE INVENTION

1. Field of the Invention

The present invention relates to a camera with an image display unit whose position can be changed according to the position of a photographer, and in particular to a digital camera and a digital camera system.

2. Description of the Related Art

Generally, a digital camera has an image display unit comprising a liquid crystal display (LCD) for monitoring images. This image display unit is usually fixed to the rear part of the camera. Thus, when a photographer takes a picture at a low or high angle, or takes a self-portrait, it is sometimes difficult to confirm the photographed image.

To overcome the above inconvenience, a camera has been proposed (refer to Jpn. Pat Appln. KOKAI Publication Nos. 8-09213 and 4-100382). In this camera, a camera body and an image display unit comprising an LCD are combined through a hinge mechanism, so that the direction of the image display unit can be changed according to the photographing position.

There has been proposed another camera. In this camera, an image display unit is compatible with a lens barrier. The image display unit of this camera is placed at the front of the photographing lens as a lens barrier while the camera is not used, and raised so that it extend above the camera body when the camera is used (refer to Jpn. Pat Appln. KOKAI Publication Nos. 11-258657 and 8-331424).

In the cameras described in the above documents, the hinge mechanism for combining the image display unit with the camera body is provided at a position easy to find from the outside. The hinge mechanism is provided at the upper end or on the rear part of the camera body.

BRIEF SUMMARY OF THE INVENTION

In accordance with an aspect of the present invention, there is provided a digital camera which eliminates the necessity of a dedicated lens barrier, contributes to miniaturization of a camera body, permits use in compact states in normal photography, and does not restrict external design.

The digital camera comprises a camera body, a photographing lens provided on the front side of the camera body, an image display unit which displays images taken through the photographing lens, and a movable unit which moves the image display unit between the front position on the front side of the camera body and a rear position on the rear side, wherein the camera body has on its side a grip unit whose one side is adjacent to the image display unit placed at the front position of the camera body, and the adjacent side is opened and can be gripped when the display unit is moved from the front position to the rear position of the camera body.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a top view, FIG. 1B is a front view, and FIG. 1C is a right side view;

FIG. 5 is a view for explaining the positions of an image display unit with respect to the camera body according to the first embodiment;

FIGS. 6A and 6B are side views of the camera body according to the first embodiment;

FIGS. 14A and 14B are front views of the camera, and FIG. 14C is a top view;

FIGS. 15A and 15B are front views of the camera, and FIG. 15C is a top view;

FIG. 16A is a top view of the camera, and FIG. 16B is a front view, and FIG. 16C is a right side view;

FIG. 24 is a flowchart for explaining the control and operations of the camera according to the third embodiment.

DETAILED DESCRIPTION OF THE INVENTION

Embodiments of the present invention will be explained hereinafter with reference to the accompanying drawings.

First Embodiment

Figure 1A:
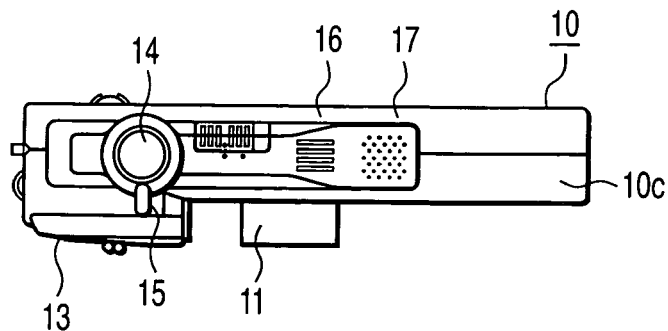
FIGS. 1A to 1C are views showing the configuration of a camera according to a first embodiment of the present invention.
Figure 1B:
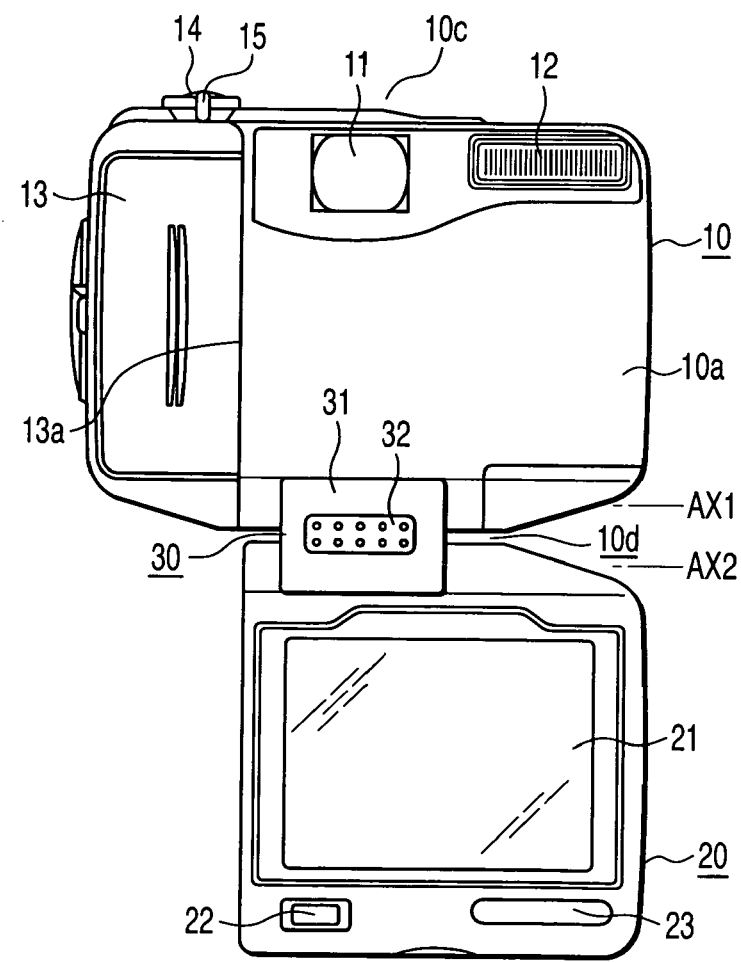
Figure 1C:
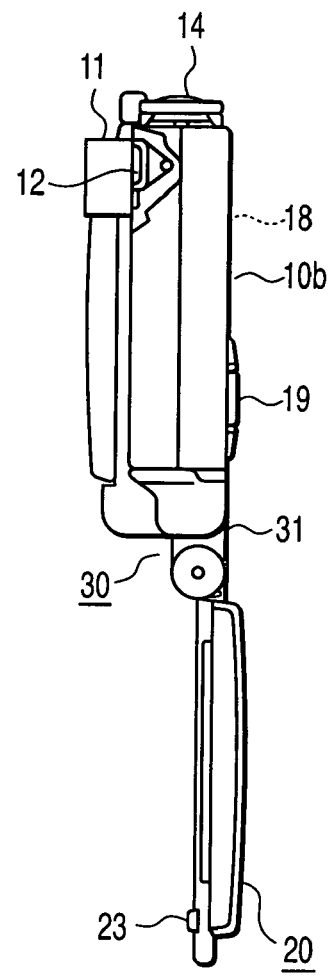

FIGS. 1A to 1C are views showing the configuration of a camera according to a first embodiment in the states that an image display unit 20 is moved downward from the front position of a camera body. FIG. 1A is a top view of a camera body 10. FIG. 1B is a front view of the camera body 10. FIG. 1C is a right side view of the camera body 10 seen from the front side. In the following description, the left and right sides of the camera indicate the sides seen from the front side of the camera body.

Figure 2:
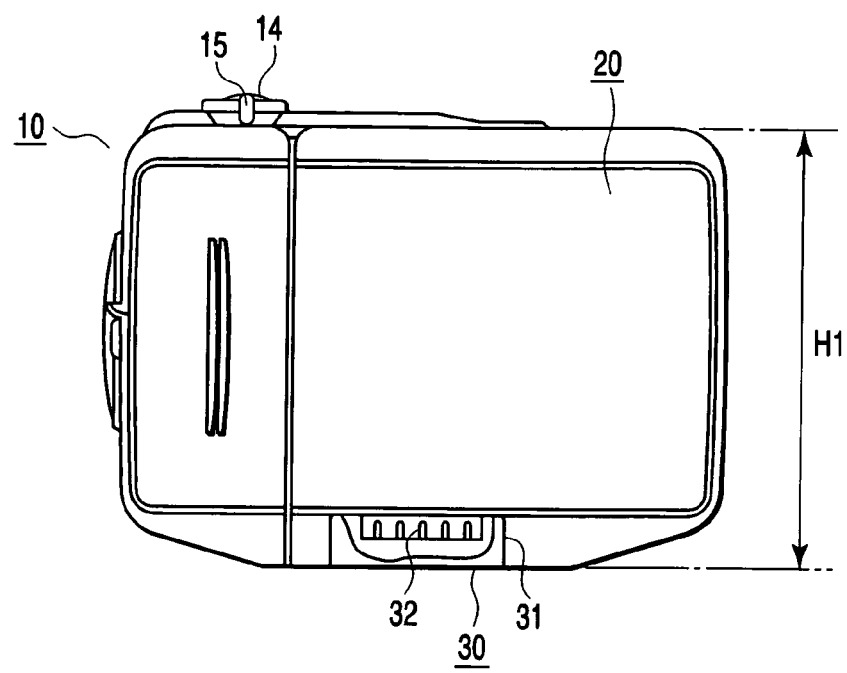
FIG. 2 is a front view showing the configuration of the camera according to the first embodiment.

FIG. 2 is a front view showing the state that the image display unit 20 according to the first embodiment is set to the front position of the camera body 10. The photographing lens 11 may protrude to take such positions as shown in FIGS. 1A and 1C when is set to the photographing mode. While the camera remains in the non-photographing mode, the photographing lens 11 lies in flush with the front 10a of the camera body 10.

Figure 3:
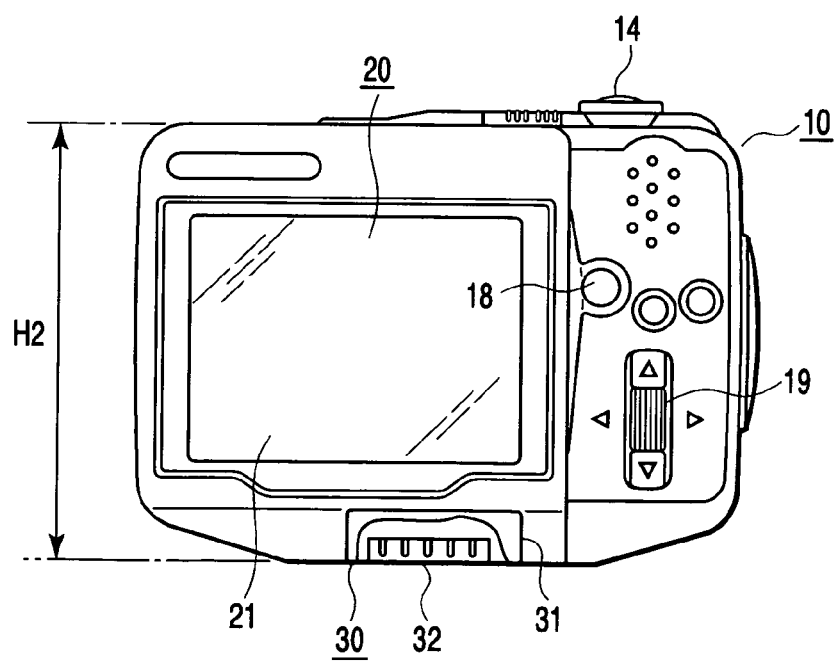
FIG. 3 is a rear view showing the configuration of the camera according to the first embodiment.

FIG. 3 is a rear view showing the state that the image display unit 20 according to the first embodiment is set to the rear position of the camera body 10.

(Configuration of the Camera)

The camera body 10 according to this embodiment is a digital camera, which has a collapsible mount type photographing lens 11 at the center of the upper part of the front side 10a as shown in FIGS. 1A and 1B. A strobe (flash) light 12 is provided on the right side adjacent to the photographing lens 10, that is, at the right end of the upper part of the front side 10a of the camera body. A cross section of the strobe light 12 illustrated in FIG. 1C. The left end portion of the front side 10a of the camera body is formed as a grip 13 to be gripped by a photographer when taking a picture.

On the upper side 10c of the camera body 10, a release button 14, a zoom rotation lever 15, a microphone 16, and a speaker 17 are arranged as shown in FIG. 1A. On the rear side 10b of the camera body 10, control buttons 18 and a display screen scroll dial 19 are arranged as shown in FIG. 1C.

The image display unit 20 is provided to be able to display images taken through the photographing lens 11 as monitor images on a display panel 21. On the same side as the display panel 21 of the image display unit 20, control members including a display button 22 to display images upside down are arranged.

A reference numeral 23 denotes a contact portion that is formed slightly projected from the display panel 21 to prevent direct contact of the display panel 21 with the camera body 10.

The image display unit 20 is moved between the preset front position on the front side of the camera body and the preset rear position on the rear side of the camera body 10, by the movable unit 30 provided at the bottom 10d of the camera body 10.

When the image display unit 20 is moved to the front position of the camera body 10 as shown in FIG. 2, the display panel opposes the front 10a of the camera body 10, covering the photographing lens 11 that lies in flush with the front 10a. In this state, the image display unit 20 serves as a lens barrier. This is the state that the camera is not used, for example, in playback mode or while being carried.

When the image display unit 20 is moved to the rear position of the camera body 10 as shown in FIG. 3, the display panel 21 is exposed on the rear side of the camera. In this state, the image display unit 20 can serve as an image check monitor in normal photographing.

As shown in FIGS. 1A to 1C, the movable unit 30 has a rectangular parallelepiped connection member 31 which pivotally connects the image display unit 20 to the camera body 10. The connection member 31 has a pair of axes AX1 and AX2 parallel to the width direction of the camera body 10 at one end and the other end, respectively. The bottom of the camera body 10 is pivotally fixed to one end of the connection member 31 through the axis AX1. The proximal end of the image display unit 20 is pivotally fixed to the other end of the connection member 31. The image display unit 20 is rotationally moved by the movable unit 30 in a substantially 360° wide angle range between the front position and rear position of the camera body 10 through the bottom 10d of the camera body 10.

In proximity to the axis AX1, a first encoder is provided as a position detection unit as described later. In proximity to the axis AX2, a second encoder is provided as a position detection unit.

The first encoder detects the rotation angle $\alpha$ of the connection member 31 to the camera body 10. The second encoder detects the rotation angle $\beta$ of the image display unit 20 to the connection member 31. The first and second encoders send the detected information to a control unit 120X described later to execute operation and control of the camera. These points will be described later in detail.

The image display unit 20 is set so that the height H1 of the upper end surface of the image display unit 20 (the height from the camera body bottom 10d) when the image display unit 20 is moved to the front position of the camera body 10 by the movable unit 30 as shown in FIG. 2 becomes substantially the same as the height H2 of the upper end surface of the image display unit 20 (the height from the camera body bottom 10) when the image display unit 20 is moved to the rear position of the camera body by the movable unit 30 as shown in FIG. 3 (H1≈H2)

The image display unit 20 is also set so that when moved to the front position of the camera body 10, the upper end of the image display unit 20 becomes continuous in appearance with the front end of the upper side 10c of the camera body 10. When the image display unit 20 is set to the rear position of the camera body 10, the upper end surface of the image display unit 20 becomes continuous in appearance with the rear end of the upper side 10c of the camera body 10.

The left end of the image display unit 20 placed at the front position of the camera body 10 is set to be continuous in appearance with the right end of the grip 13 provided at the left end of the camera body 10.

Therefore, when the image display unit 20 is placed at the front position of the camera body 10, as shown in FIG. 2, the image display unit 20 is adjacent to the right side of the grip 13, and the front surface appearance of the camera is formed by the front side of the grip 13 and the reverse side of the display panel 21 of the image display unit 20.

When the image display unit 20 is placed at the rear position of the camera body 10, as shown in FIG. 3, the image display unit 20 is separated from the side of the grip 13, the right side adjacent to the grip 13 is opened, and the grip 13 is projected forward from the camera body 10. The grip 13 can be then gripped by the right hand of a photographer (as indicated by a dotted line in FIG. 13). This ensures the stability of the camera during photography, even if the image display unit 20 is rotationally movable.

To ensure the holding of the grip, in the camera of the first embodiment, the width of the image display unit 20 with respect to the camera body 10 is set to a dimension such that the left side of the camera body is remaining in the shape suitable for gripping. If the remained dimension of the camera body is improper, or the width of the image display unit 20 is set equal to the front side of the camera body, the grip portion is lost. In contrast, if the width of the image display unit 20 is narrow, the width of the grip becomes too wide to grip with fingers.

The shape of the grip is not to be limited to the shape of the first embodiment, but various modifications are available. For example, a joint 13a of the grip 13 and image display unit 20 is set straight viewed from the front side of the camera in the embodiment 1. It is also possible to make the shape easier to grip.

(Modification)

FIGS. 14A to 14C and FIGS. 15A to 15C show modifications 1 and 2 of the first embodiment. In the modification of the shape of the joint of the grip 13, the same reference numerals are given to the same components.

Figure 14A:
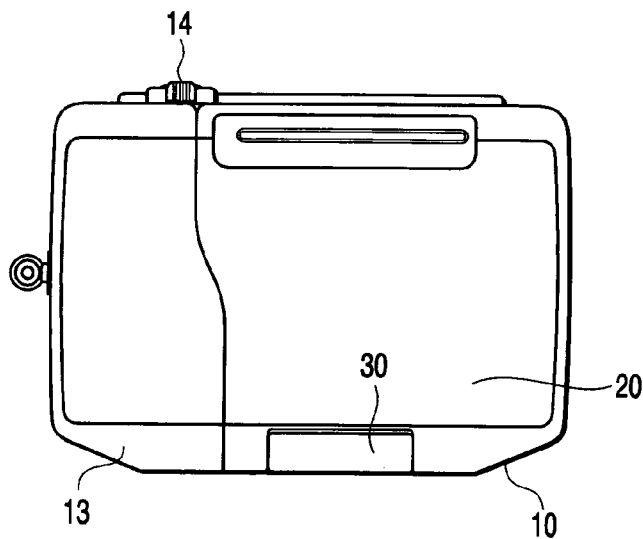
FIGS. 14A to 14C are views showing the configurations of a camera according to modification 1 of the first embodiment.
Figure 14B:
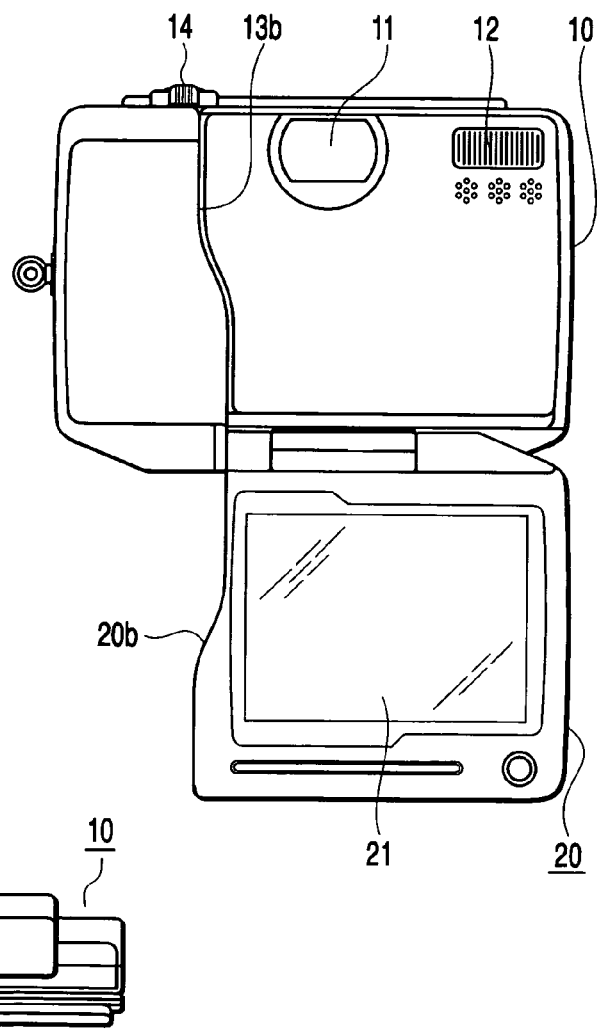
Figure 14C:
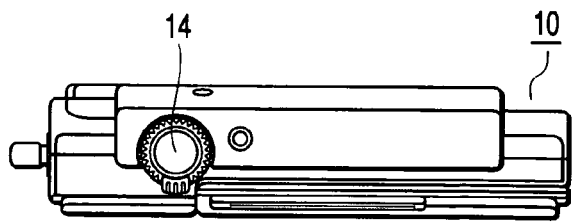

FIGS. 14A and 14B are front views of the camera body according to the modification 1. FIG. 14A shows the state that the image display unit 20 is placed at the front position. FIG. 14B shows the state that the image display unit 20 is opened. FIG. 14C is a top view of the camera body 10 that remains in the condition illustrated in FIG. 14A.

In the modification 1, the joint 13b of the grip 13 is made narrow in the upper part and wide in the lower part by changing the width of the grip 13 viewed from the front side. This grip shape is easier to hold than the straight line shape. As in the first embodiment, when the image display unit 20 is placed at the front position, the image display unit 20 becomes continuous with the grip 13 in the appearance of the camera.

Figure 15A:
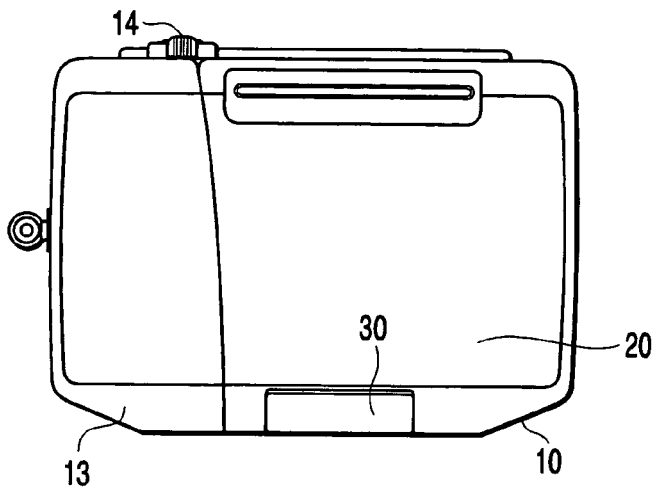
FIGS. 15A to 15C are views showing the configuration of a camera according to modification 2 of the first embodiment.
Figure 15B:
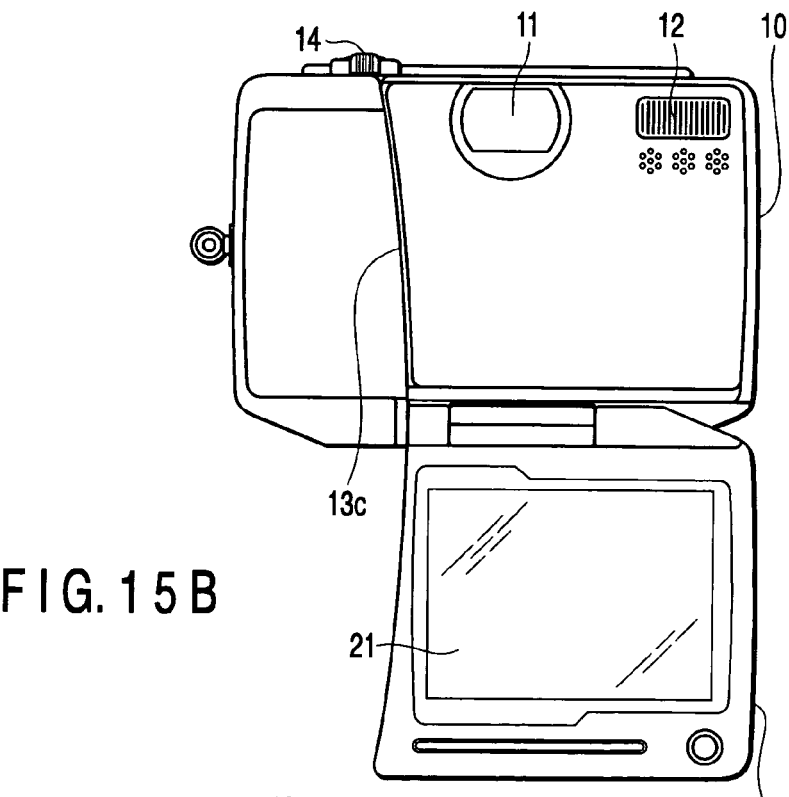
Figure 15C:
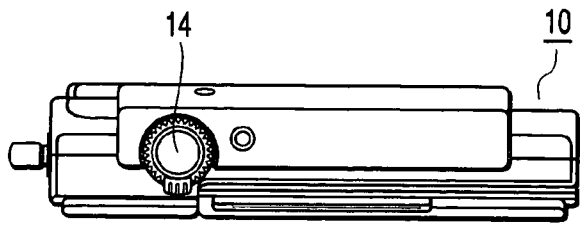

FIGS. 15A and 15B are front views of the camera body according to a modification 2. FIG. 15A shows the state that the image display unit 20 is placed at the front position. FIG. 15B shows the state that the image display unit 20 is opened. FIG. 15C is a top view of the camera body 10 that remains in the condition illustrated in FIG. 15A.

In the modification 2, as in the modification 1, the joint 13c of the grip 13 is made narrow in the upper part and wide in the lower part by changing the width of the grip 13 viewed from the front side. The grip is formed by a continuous curve to make it easier to hold. As in the above embodiment, when the image display unit 20 is placed at the front position, the image display unit 20 becomes continuous with the grip 13 in the appearance of the camera.

The connection member 31 is provided with a connector 32 as a connection unit to electrically connect the camera body 10 to a connector such as a camera stand. The connector 32 is opposed to the bottom of the camera body 10, when the image display unit is at the front position of the camera body 10. Therefore, in this state, the connector 32 is not exposed to the outside. When the image display unit 20 is at the rear position of the camera body 10, the connector is exposed to the outside of the bottom of the camera body 10.

Figure 4A:
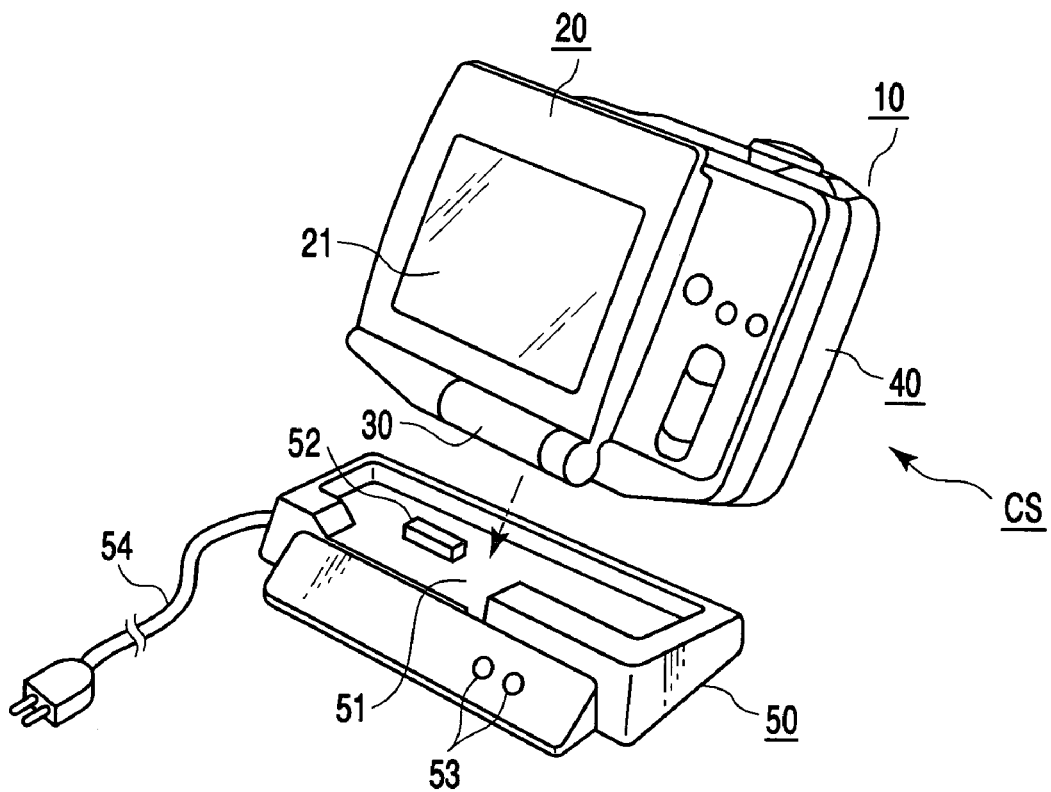
FIGS. 4A and 4B are external views of a camera system having the camera according to the first embodiment and a camera stand.
Figure 4B:
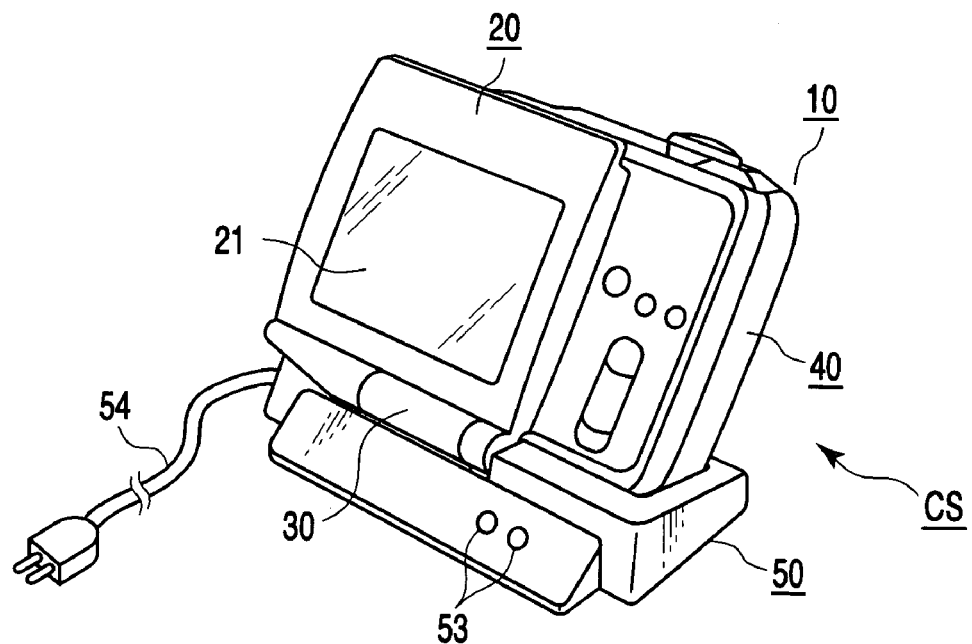

FIGS. 4A and 4B show a camera system CS which is configured to place the camera 40 of this embodiment (camera body 10+image display unit 20+movable unit 30) in a camera stand 50 as an accessory.

FIG. 4A shows the state immediately before the camera 40 is placed in the camera stand 50. FIG. 4B shows the state that the camera 40 is placed in the camera stand 50.

As shown in FIGS. 4A and 4B, the camera stand 50 has a connector 52 on a camera mount base 51 to connect with the connector provided in the connection member 31 of the camera. When the camera 40 is put on the camera mount base 51 of the camera stand 50, the connector 52 is connected to the connector 32 of the camera, and the camera 40 is electrically connected to the camera stand 50.

A reference numeral 53 denotes control buttons provided on the surface of the camera stand, and 54 denotes a power cord. The camera stand 50 contains a charger (not shown) to charge a secondary battery built into the camera body 10. This charges the built-in battery of the camera, and drives the camera with an external power supply. This is also used to transfer image data and control the camera.

Figure 13:
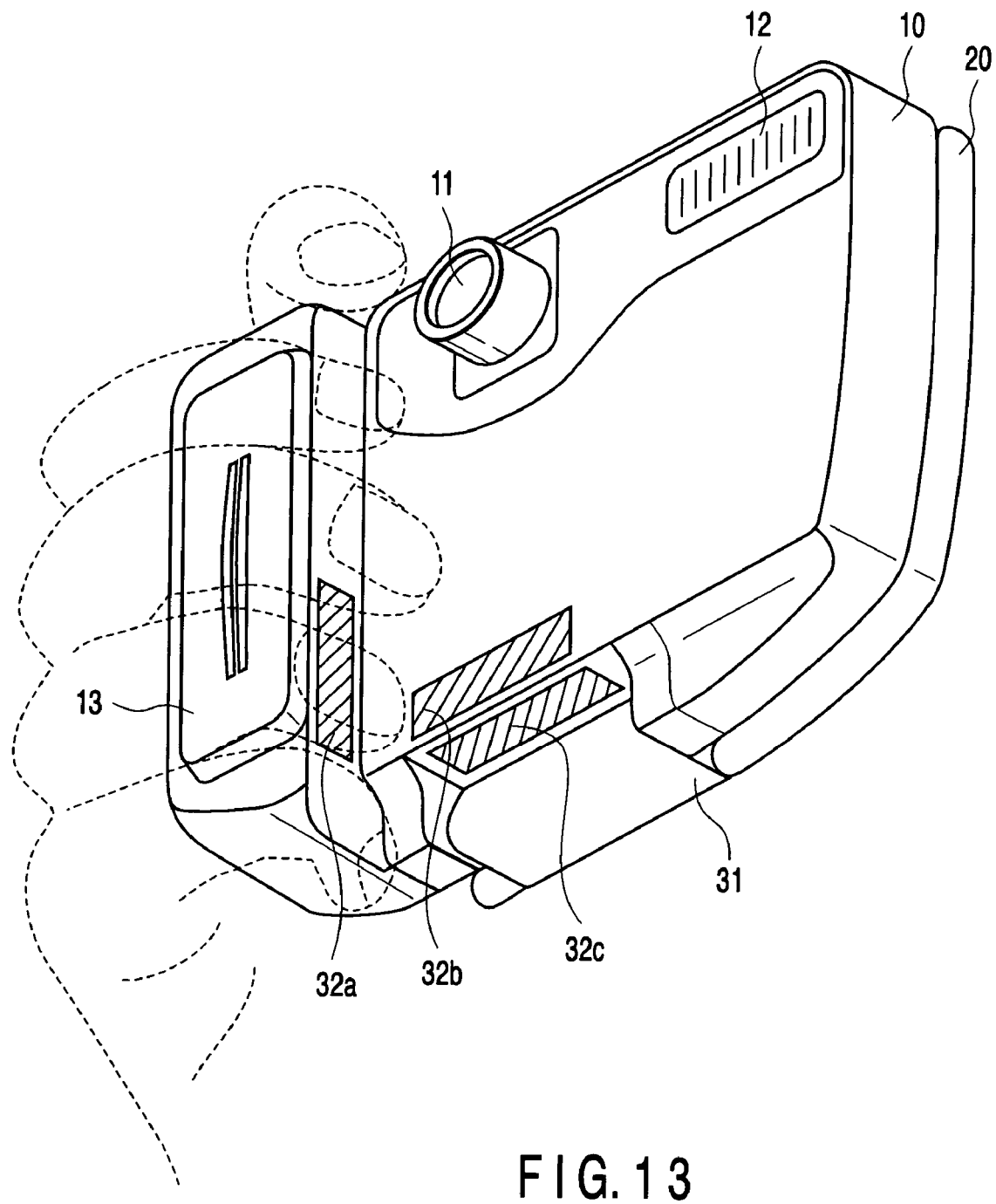
FIG. 13 is a view showing a modification of a connection unit of the camera according to the first embodiment.

The connector 32 is provided on one side of the movable unit 30 in this example. It is also possible to provide it on the other parts than one side of the movable unit 30, as shown in FIG. 13, for example, the step inside 32a of the grip 13, the lower front 32b of the camera body 10, the bottom 32c of the camera body 10, or the area covered by the image display unit 20 when the image display unit 20 is at the front position. This effectively protects the connector 32 when the camera is not used.

(Movement of the Image Display Unit 20)

Now, description will be given on the relative movement of the image display unit 20 to the camera body 10 in the camera of the first embodiment. For simplicity of description, the positions (rotation angles) of the image display unit 20 to the camera body 10 will be defined in advance.

FIG. 5 is a view for definition of the positions (rotation angles) of the image display unit 20 with respect to the camera body 10.

(1) The counterclockwise direction indicated by an arrow in the drawing is a "+" rotation direction.

(2) The relative movement angle of the connection member 31 to the camera body 10 is $\alpha$. When the connection member 31 contacts the bottom of the camera body 10, the angle $\alpha=0°$.

(3) The relative movement angle of the image display unit 20 to the connection member 31 is $\beta$. When the image display unit 20 contacts the front side of the camera body 10 with $\alpha=0°$, the angle $\beta=0°$.

(4) The relative movement angle of the image display unit 20 to the front side of the camera body 10 is $\theta$. Therefore, $\theta=\alpha+\beta$.

FIGS. 6A and 6B are side views showing the states that the image display unit 20 contacts the front side and rear side of the camera body 10, respectively. The state of FIG. 6A is expressed by $\alpha=0°$, $\beta=0°$ and $\theta=0°$ according to the above definition. The state of FIG. 6B is expressed by $\alpha=180°$, $\beta=180°$ and $\theta=360°$ according to the above definition.

The photographing lens 11 is at the position housed in the camera body in the state of FIG. 6A, and at the driven-out position in the state of FIG. 6B.

Figure 7B:
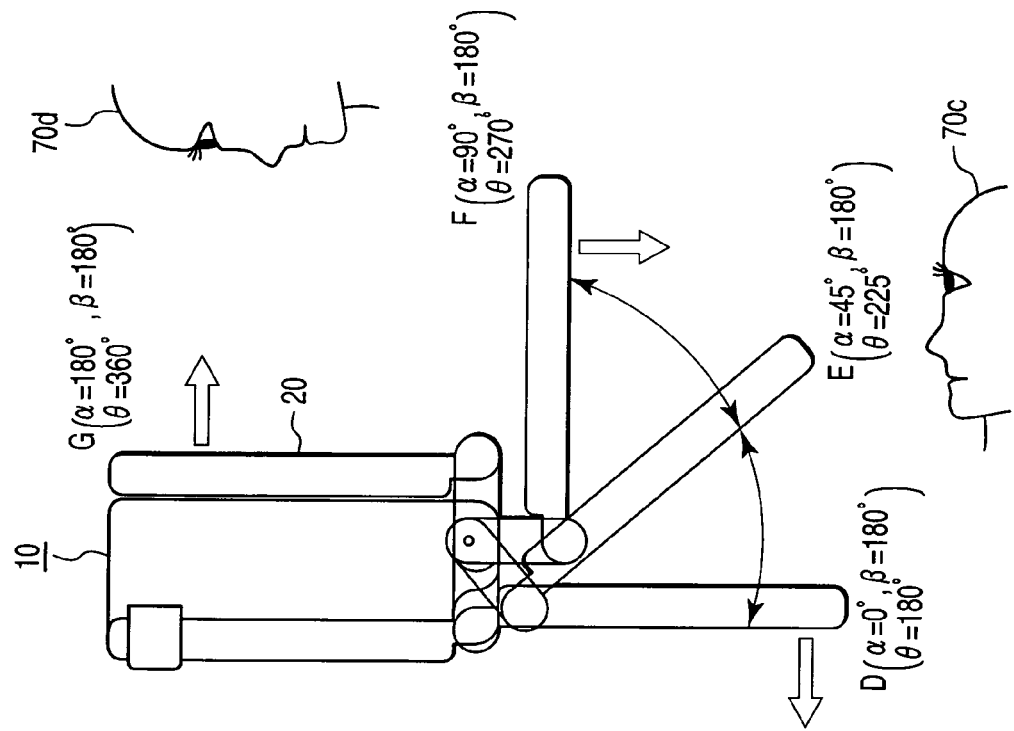
FIGS. 7A and 7B are views showing the states of the image display unit upon photographing with the camera according to the first embodiment.
Figure 7A:
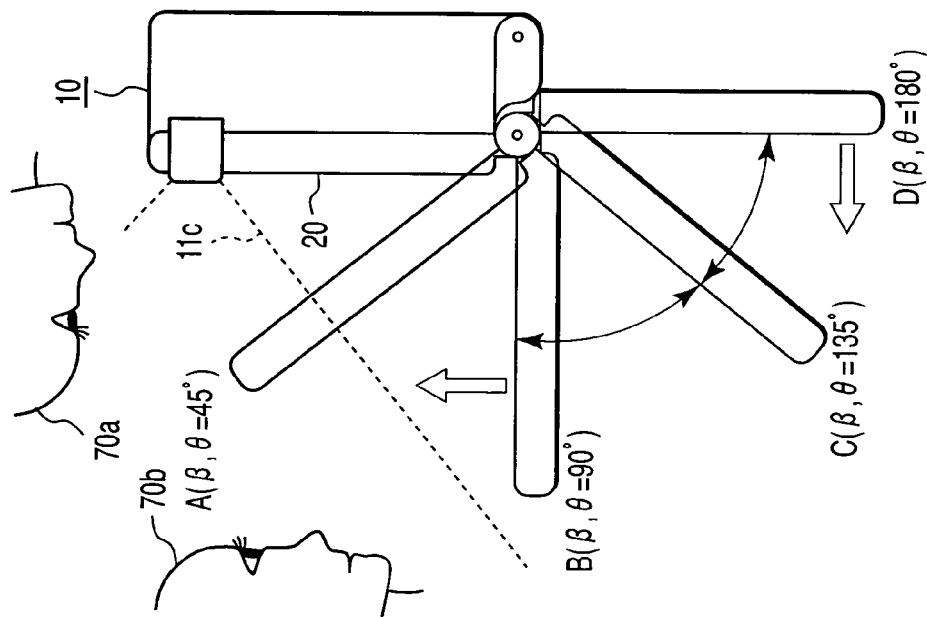

FIGS. 7A and 7B are views showing the states of the camera upon photographing including the relative movement of the image display unit 20. Thick arrows shown in FIG. 7 indicate the image displaying directions on the display panel 21. FIG. 7A is a view showing the state that only the image display unit 20 is moved in the "+" direction in the state that the relative movement angle α of the connection member 31 to the camera body 10 is fixed to α=0°.

In the state A (β=45° and θ=45°), the image display unit 20 is moved 45° from the front position of the camera body 10 and the lens can be driven out. Therefore, the angle of the image display unit 20 in this state is defined as a lens drive-out permit angle.

In the state B (β=90° and θ=90°), the image display unit 20 is moved 90° from the front position of the camera body 10, the image display unit 20 is moved to the position out of the range of the photographing angle 11c of the photographing lens 11, and photography is possible. Therefore, the angle of the image display unit 20 in this state is defined as a photographing permit angle.

In the state C (β=135° and θ=135°), the image display unit 20 is moved 135° downward at the front of the camera body 10. The range from the state B (β=90° and θ=90°) to C (β=135° and θ=135°) is the angles suitable for low-angle photography just like a photographer takes the position 70a. Therefore, this angle range is defined as a low-angle photographing range.

In the state D (β=180° and θ=180°), the image display unit 20 is moved 180° downward at the front of the camera body 10. The range from the state C (β=135° and θ=135°) to D (β=180° and θ=180°) is the angles suitable for self-portrait just like a photographer takes the position 70b. Therefore, this angle range is defined as a self-portrait range. The state D indicates the limit of movement in the "+" direction of the image display unit 20 to the connection member 31.

FIG. 7B is a view showing the state that only the connection member 31 is moved in the "+" direction in the state that the relative movement angle β of the image display unit 20 to the connection member 31 is fixed to β=180°.

The state D (α=0°, β=180° and θ=180°) is the same as the state D shown in FIG. 7(a).

In the state E (α=45°, β=180° and θ=225°), the connection member 31 is moved 45° against the camera body 10. The range from the state D (α=0°, β=180° and θ=180°) to E (α=45°, β=180° and θ=225°) is the angles suitable for self-portrait. Therefore, this angle range is defined as a self-portrait range, as in the range from C to D described above.

In the state F (α=90°, β=180° and θ=270°), the connection member 31 is moved 90° against the camera body 10. The range from the state E (α=45°, β=180° and θ=225°) to F (α=90°, β=180° and θ=270°) is the angles suitable for high-angle photographing just like a photographer takes the position 70c. Therefore, this angle range is defined as a high-angle photographing range.

In the state G (α=180°, β=180° and θ=360°), the connection member 31 is moved 180° against the camera body 10 and the image display unit 20 contacts the rear side of the camera. This state is the angles suitable for normal photographing just like a photographer takes the position 70d. Therefore, this angle is defined as a normal photographing angle.

Figure 8A:
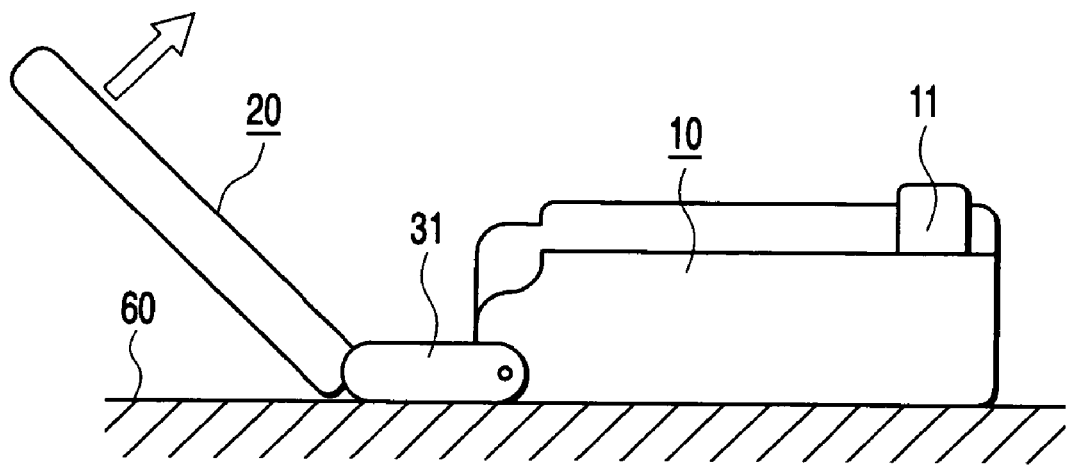
FIGS. 8A and 8B are views showing the states of the image display unit of the camera upon playback with the camera according to the first embodiment.
Figure 8B:
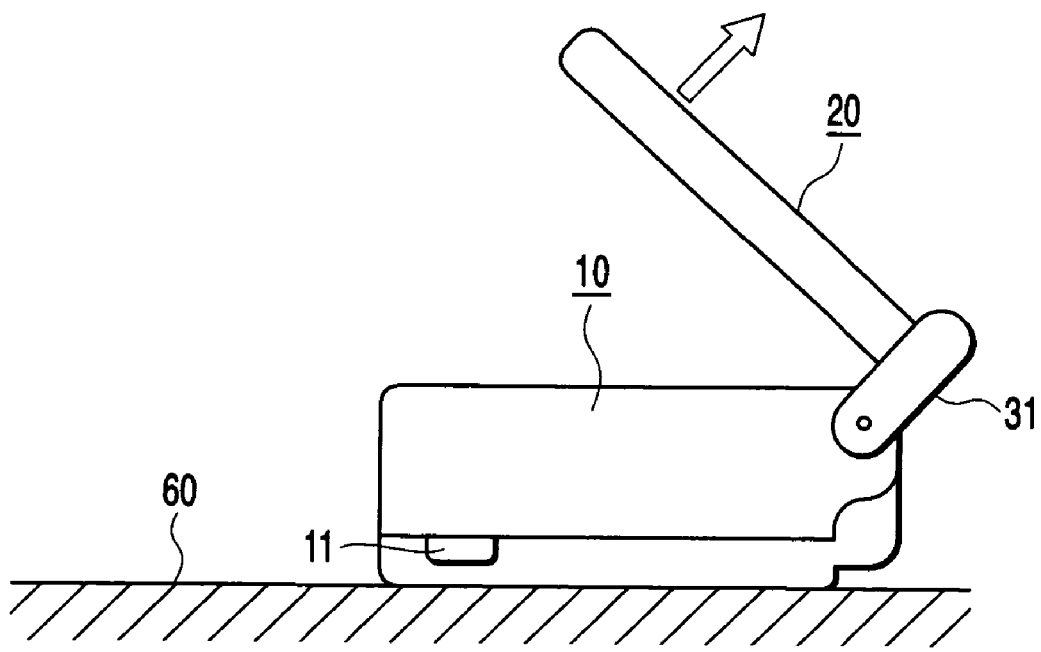

FIGS. 8A and 8B are views showing the states of the camera upon playback including the relative movement of the image display unit 20. FIG. 8A shows the state that the camera is placed in a stand 70 such as a desk with the rear side down. The relative movement angle θ of the image display unit 20 at this time is desirably set to θ=135° with α=90° and β=45°.

FIG. 8B shows the state that the camera is placed in a stand 70 such as a desk with the front side down. The relative movement angle θ of the image display unit 20 at this time is desirably set to θ=315° with α=135° and β=180°.

In the state of FIG. 8B, the photographing lens 11 is pulled in to the position not abutting the stand 60.

(Configuration of the Camera System)

Figure 9:
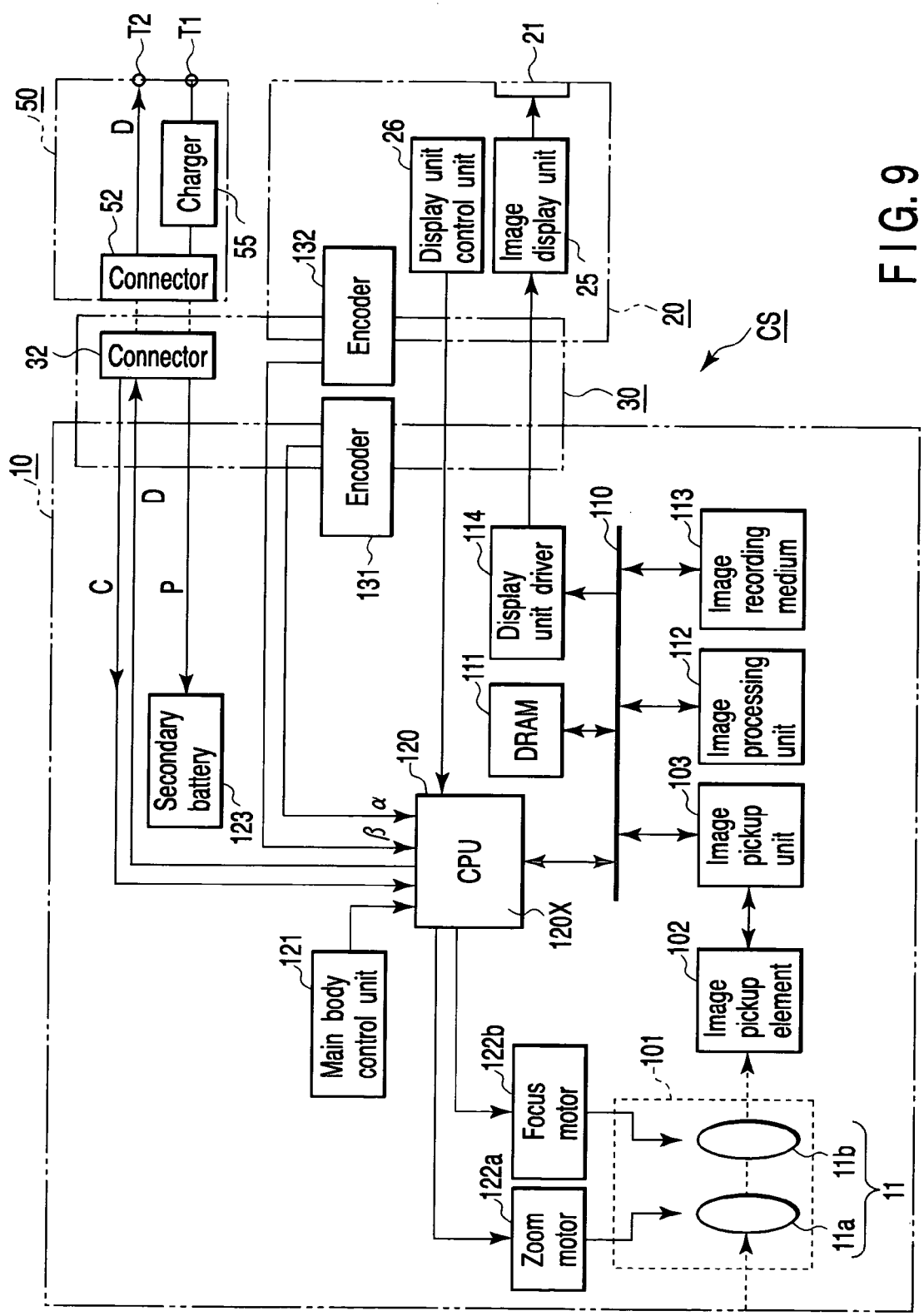
FIG. 9 is a block diagram showing the configuration of the camera system according to the first embodiment.

FIG. 9 is a block diagram showing the configuration of a camera system CS of this embodiment.

The camera system CS comprises a camera body 10, an image display unit 20, a movable unit 30 including a connection member 31, and a camera stand 50.

A subject image taken by photographing optics 101 including the photographing lens 11 of the camera body 10 is converted into an electric signal corresponding to the subject image by an image pickup element (e.g., a CCD pickup element) 102. The converted electric signal is converted into image data by an image pickup unit 103 (hereinafter referred to as a unit). The image data is stored temporarily in a temporary memory 111 comprising a DRAM or the like through a data bus 110. The temporarily stored image data is compressed in an image processing unit 112, and stored in an image recording medium 113 which permits use of a removable memory card or the like.

The image data stored in the image recording medium 113 is read from the image recording medium 113 upon playback, extended in the image processing unit 112, and stored temporarily in the temporary memory 111. The temporarily stored playback image data is supplied to an image display unit 25 comprising an LCD, for example, through a display unit drive 114. The image display unit 25 displays a required image on a display panel 21 at a given display position.

The camera system CS of this embodiment has a central processing unit (CPU) 120 including a control unit described later. The CPU 120 is operated by the instructions from the main body control unit 121 and display unit control unit 26, and is also operated in response to the combination information C from the connector 32 which indicates that the camera body 10 is placed in the camera stand 50.

A zoom motor 122a performs zooming by moving a zoom lens 11a of the photographing lens 11 along the optical axis based on the control signal from the CPU 120. A focus motor 122b adjusts the focus by moving a focusing lens 11b of the photographing lens 11 along the optical axis based on the control signal from the CPU 120.

In the state that the camera is placed in the camera stand 50, the AC power supplied from a terminal T1 is transformed and rectified by a charger 55, and supplied to a secondary battery 123 built into the camera body 10 through connectors 52 and 32. Thus, the battery 123 is charged. The image data D can be transferred from the CPU 120 to an external personal computer through a terminal T2 of the camera stand 50 through the connectors 32 and 52.

A control unit 120X included in the CPU 120 controls the camera according to the positions of the image display unit 20 changed by the movable unit 30. Namely, the control unit 120X controls the camera as described below, according to the relative movement angle α of the connection member 31 to the camera body 10 detected by a first encoder 131 as a position detection unit provided in the connection member 31 in the movable unit 30, and the relative movement angle β of the image display unit 20 to the connection member 31, that is, based on the sum of α and β, that is, the angle θ of the image display unit 20 to the camera body 10.

Figure 10:
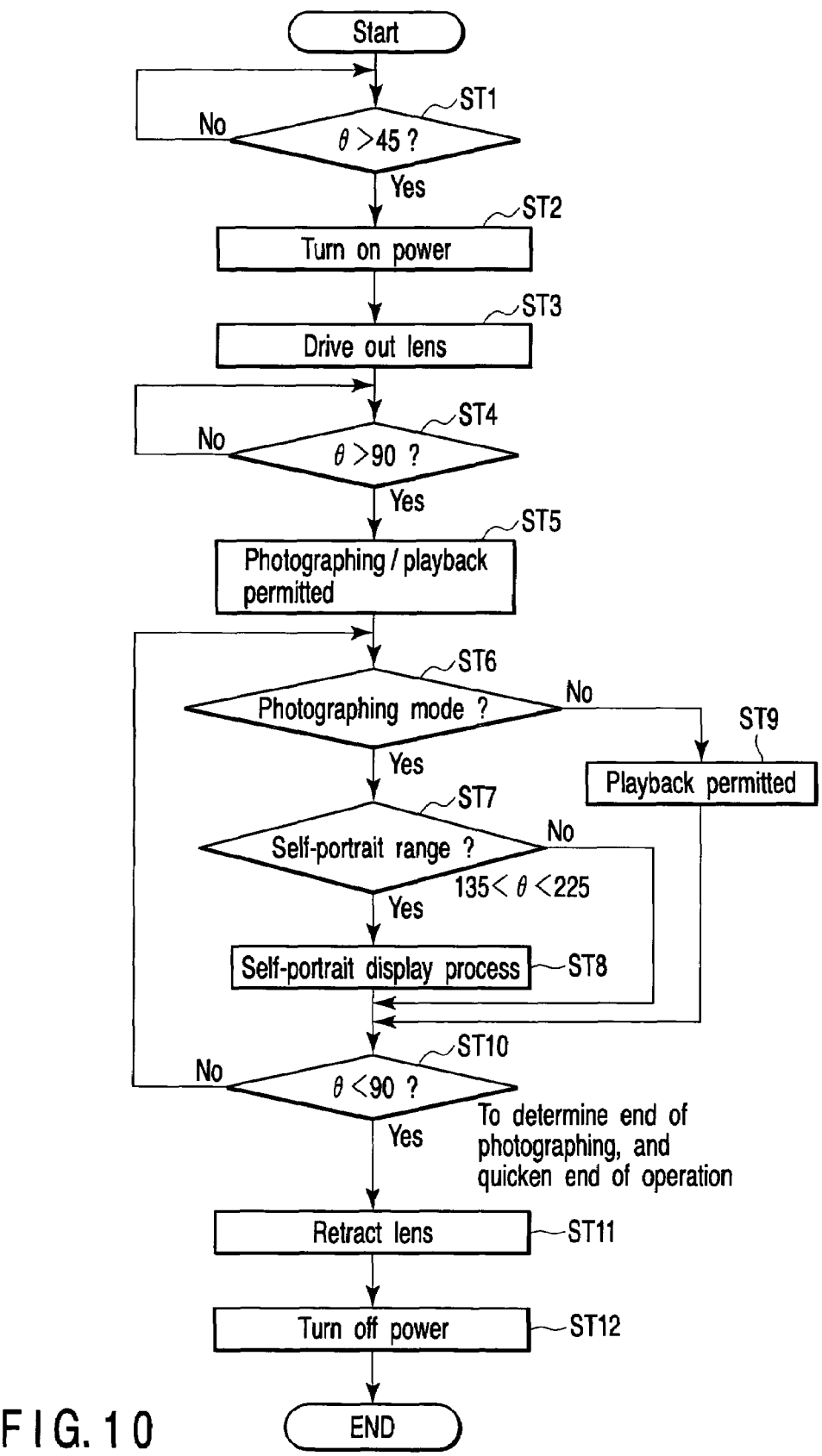
FIG. 10 is a flowchart for explaining the control operation of the camera according to the first embodiment.

FIG. 10 is a flowchart showing the procedure of the control operations by the control unit 120X. Explanation will be given on each step shown in FIG. 10.

Step ST1: Whether θ is over 45° is determined. If θ is below 45°, a standby state is held. If θ rises over 45°, go to step ST2.

Step ST2: The main power supply is turned on. Go to step ST3.

Step ST3: The lens drive-out permit angle is set, and the photographing lens 11 is driven. Go to step ST4.

Step ST4: Whether θ is over 90° is determined. If θ is below 90°, a standby state is held. If θ rises over 90°, go to step ST5.

Step ST5: θ rises over 90°, the photographing/playback permit angle is set, and photographing or playback is executed.

Step ST6: Whether photographing mode is set is determined. If setting of photographing mode is confirmed, go to step ST7.

Step ST7: Whether the self-portrait range is set is determined. If setting of the self-portrait range is confirmed, go to step ST8. If setting of the self-portrait range is not confirmed, go to step ST10.

Step ST8: Self-portrait display is set. Namely, the direction of a display image displayed in the image display unit 20 is reversed upside down according to the photographer's position 70b. Namely, when the photographer's position is 70b, the top and bottom of display must be reversed unlike the other positions 70a, 70c and 70d. It is also permitted to add a mirror image reversing process to reverse the left and right of a display image. Thereafter, the camera takes a picture every time the user pushes the release button 14.

Step ST9: If setting of photographing mode is not confirmed in step ST6, playback is performed. After the end of playback, go to step ST10.

Step ST10: Whether θ is over 90° is determined. If θ is below 90°, return to step ST6. If θ is over 90°, the end of photographing is confirmed. Go to step ST11.

Step ST11: The photographing lens 11 is retracted. Go to step ST12.

Step ST12: The main power supply is turned off, and a series of control operations is finished.

Second Embodiment

Figure 11A:
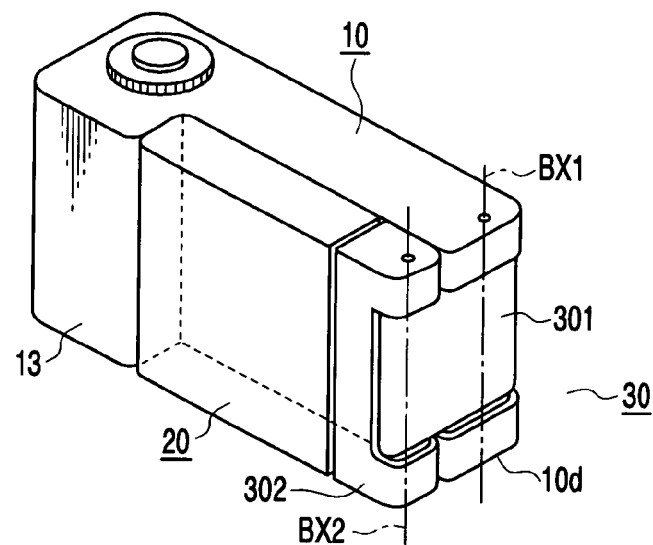
FIGS. 11A to 11C are external views of a camera according to a second embodiment of the present invention.
Figure 11B:
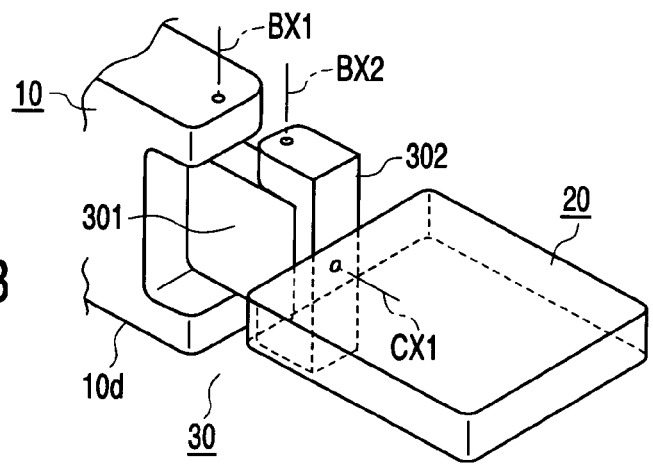
Figure 11C:
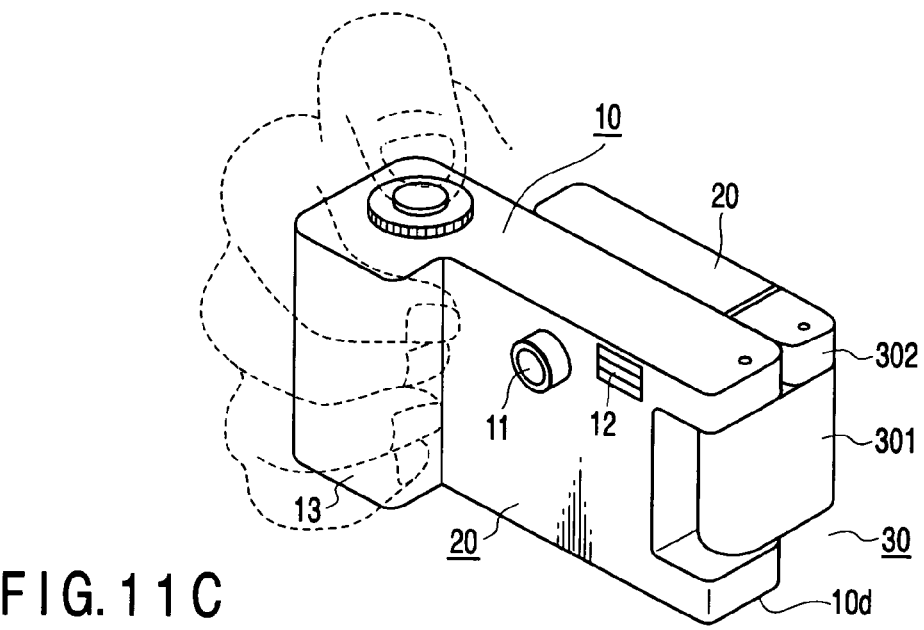

FIGS. 11a to 11c show the configuration of a camera according to a second embodiment.

A main different point between the second embodiment and first embodiment is that the movable unit 30 is provided on the side of the main body 10 and the image display unit 20 is pivotally fixed the bottom 10d of the camera body 10 to be movable on the axis vertical to the bottom 10d of the camera body 10.

In the second embodiment, the movable unit 30 comprises a first connection member 301 whose one end is pivotally fixed to the camera body 10 to be movable on the axis BX1 vertical to the bottom 10d of the camera body 10, and a second connection member 302 whose one end is pivotally fixed to the other end of the connection member 301 to be movable on an axis BX2 vertical to the bottom 10d of the camera body 10. The image display unit 20 is pivotally fixed to the other end of the second connection member 302 to be movable rotatably on an axis CX1 parallel to the bottom 10d of the camera body 10.

Figure 12A:
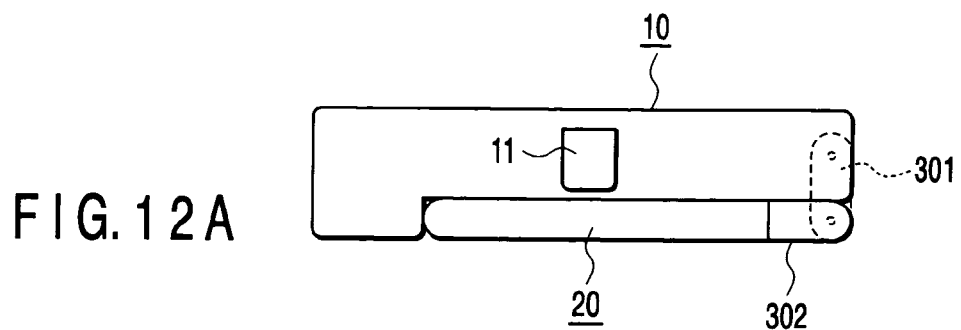
FIGS. 12A to 12C are views showing the states of the image display unit upon photographing with the camera according to the second embodiment.
Figure 12B:
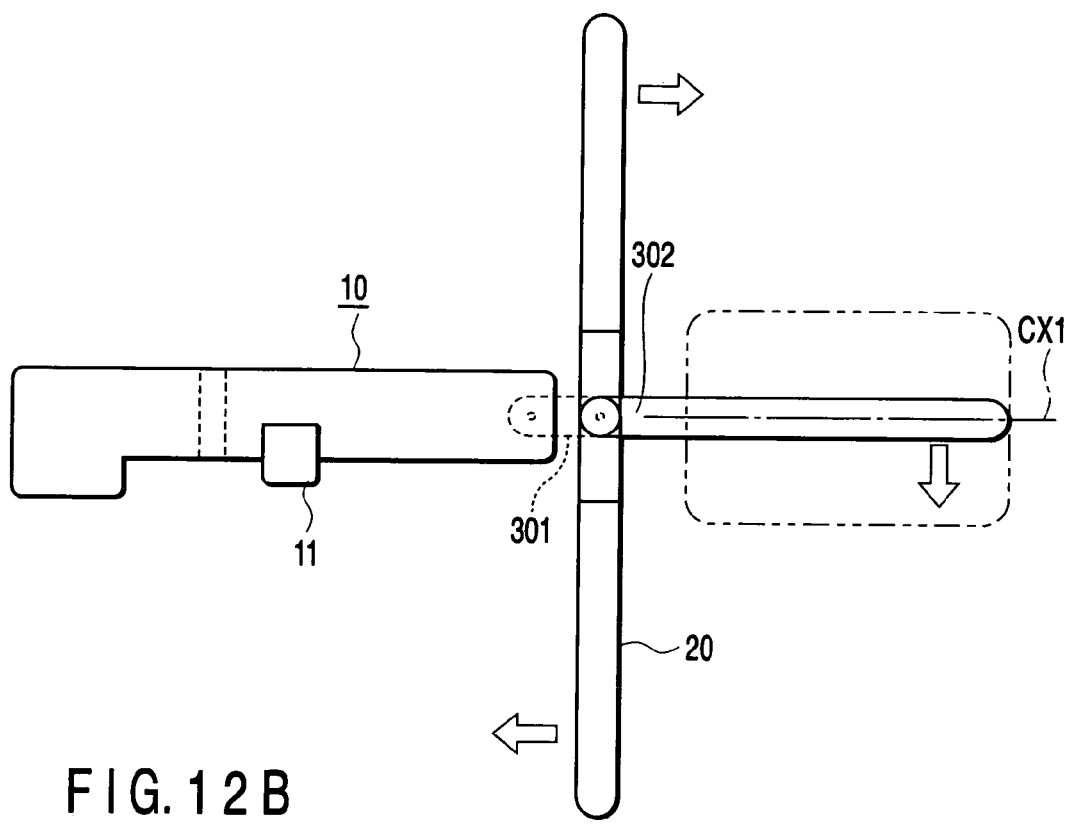
Figure 12C:
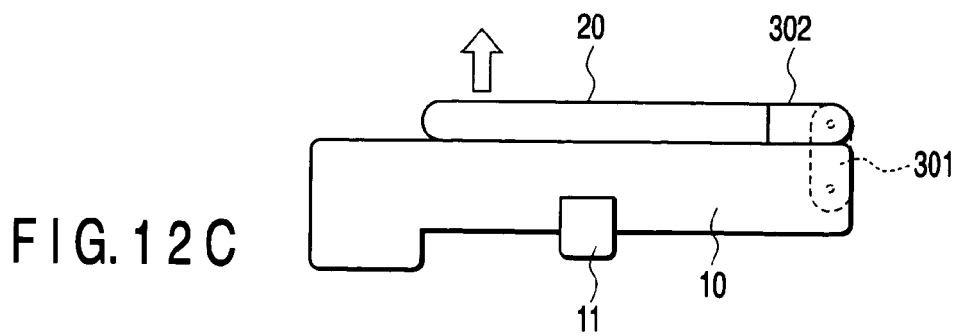

FIGS. 12A to 12C show the states of the camera including relative movement of the image display unit 20 upon photographing.

FIGS. 12A to 12C are top plan views showing the states that the image display unit 20 contacts the front side and rear side of the camera body 10. FIG. 12B is a top plan view showing three states of the image display unit 20 when β=0°, β=90°, β=180° with α fixed to 90°. It is characteristic that the image display unit 20 is rotationally movable around an axis CX1 with respect to a second connection member 302 as indicated by a broken line.

In the above camera, the image display unit 20 is movable in the horizontal direction of the camera body 10, and even if the camera body 10 is fixed to a tripod, movement of the image display unit 20 will not be disturbed by the surrounding members. While the image display unit 20 can be moved in the horizontal direction, the unit 20 can also be moved in the vertical direction around the CX1. This permits low-angle and high-angle photography with ease.

In the state that the image display unit 20 is in contact with the front side of the camera body (FIG. 12A), the image display unit 20 adjoins closely to the right side of the grip 13 provided on the left side of the camera body, and the image display unit 20 and grip 13 form the continuous outside surface. In the state that the image display unit 20 is in contact with the rear side of the camera body, as shown in FIG. 11C, the right side of the grip 13 is opened and the grip 13 can be gripped.

Characteristics in the First and Second Embodiments

[1] The camera according to the embodiments comprises a camera body 10, a photographing lens 11 provided on the front side of the camera body 10, an image display unit 20 which displays images taken through the photographing lens 11, and a movable unit 30 which moves the image display unit 20 between the front position on the front side of the camera body 10 and the rear position on the rear side. The camera body has on its side a grip unit 13 whose one side is adjacent to the image display unit 20 placed at the front position of the camera body 10, and the adjacent side is opened and can be gripped by movement of the image display unit 20 from the front position to the rear position of the camera body.

In this camera, the front part excluding the grip portion is made rotationally movable as an image display unit, the grip portion automatically comes out when the image display unit is moved to photographing states, and photographing is stabilized.

[2] The camera according to the embodiments is the camera described in [1] above. The image display unit 20 is set so that when moved to the front position, the display panel is faced to the front side of the camera body 10 just like covering the photographing lens 11, and the outside surface of the image display unit 20 placed at the front position of the camera body 10 becomes continuous with the outside surface of the grip unit 12 provided on the side of the camera body 10.

[3] The camera according to the embodiments is the camera described in [1] above. The movable unit 30 has a unit, which rotationally moves the image display unit 20 in an angle range of approximately 360° between the front position and rear position, and sets the height H of the upper end surface of the image display unit 20 from the bottom 10d of the camera body becomes substantially the same at the front and rear positions of the camera body 10.

In the above camera, the states in front of and behind the camera are well balanced.

[4] The camera according to the embodiments is the camera described in [1] above.

The movable unit 30 has a unit which rotationally moves the image display unit 20 in an angle range of approximately 360° between the front position and rear position, and sets the upper end surface of the image display unit 20 to be continuous with the upper surface 10c of the camera body in appearance at either front or rear position of the camera body 10.

In the above camera, the surface of the image display unit 20 is continuous with the surface of the camera body 10 at either front or rear position of the camera body 10, giving the feeling as one body with the camera body 10. Therefore, the appearance of the whole camera becomes excellent.

[5] The camera according to the embodiments is the camera described in [1] above. The movable unit 30 is provided at the bottom 10d of the camera body 10.

In the above camera, as the movable unit 30 is provided at the bottom 10d of the camera 10, designing is easy.

[6] The camera according to the embodiments is the camera described in [5] above. The movable unit 30 has a unit which rotationally moves the image display unit 20 in an angle range of approximately 360° between the front position and rear position through the bottom 10d of the camera body 10.

[7] The camera according to the embodiments is the camera described in [5] above. The movable unit 30 has a connection member 31, which is provided movably on the axes (AX1 and AX2) parallel to the width direction of the camera body 10, and whose one end is pivotally fixed to the camera body 10 and the other end is pivotally fixed to the image display unit 20.

[8] The camera according to the embodiments is the camera described in [7] above. The connection member 31 has a connection unit (a connector 32) to connect the camera body 10 electrically to an accessory (a camera stand 50) added to the camera body 10.

In the above camera, the connection member 31 coming out at the bottom of the camera body 10 can be effectively used as a connection unit 32 to make connection with an accessory (a camera stand 50).

[9] The camera according to the embodiments is the camera described in [8] above. The connection unit is provided on one side of the connection member 31 which is opposed to the bottom 10d of the camera body 10 when the image display unit 20 is at the front position, and exposed outside the camera body 10 when the image display unit 20 is at the rear position.

In the above camera, in the state that the connection member 31 is used as a connection unit, the image display unit 20 placed at the rear position of the camera body 10 can be used as an image check monitor.

[10] The camera according to the embodiments is the camera described in the above [8]. The connection unit is provided on the surface of the camera body 10 so as to be covered when the image display unit 20 is at the front position, and exposed when the image display unit 20 is at the rear position.

[11] The camera according to the embodiments is the camera described in [1] above. This camera has a control unit 100 which controls the operations of the camera body 10 according to the positions of the image display unit 20 changed by the movable unit 30.

In the above camera, when the positions (rotation angle and direction) of the image display unit 20 are changed, the operations of the camera are automatically controlled according to the changed positions. Therefore, it is unnecessary for a photographer to perform troublesome manual operations each time of taking a picture.

[12] The camera according to the embodiments is the camera described in [11] above. The control unit 120X has a unit which controls the driving the photographing lens 11 to the front of the camera body 10, according to the positions of the image display unit 20.

In the above camera, as the timing of driving out the photographing lens 11 is properly controlled, the photographing lens 11 is prevented from abutting the other members due to an unexpected drive-out motion.

[13] The camera according to the embodiments is the camera described in [11] above. The control unit 120X has a unit which changes and controls the direction of an image displayed in the image display unit 20, according to the positions of the image display unit 20.

In the above camera, the direction of a displayed image is automatically controlled to a correct display direction, even if the direction of the display panel is changed by the changes in the position of the image display unit 20 (e.g., in the self-portrait, the display panel direction is upside down).

[14] The camera according to the embodiments is the camera described in [11] above. The control unit 120X includes a detection unit (encoders 131, 132, etc.) which detects the positions of the image display unit 20 based on the rotation angle ($\alpha$) of the connection member 31 to the camera body 10, and the rotation angle ($\beta$) of the image display unit 20 to the connection member 31, and a unit 120X which controls the camera operations of the camera body 10 according to the positions detected by the detection unit.

In the above camera, as the positions of the image display unit 20 can be correctly detected by the detection unit (encoders 131, 132, etc.), appropriate camera control is possible.

[15] The camera according to the embodiments is the camera described in [1] above. Control members (up-down/reverse buttons 22, etc.) are arranged on the same side as the display panel of the image display unit 20.

In the above camera, the display panel is exposed when the camera is used, and good operability can be obtained. Further, as an empty space can be effectively used, and the control members can be arranged with room, compared with the case that the control members are arranged only in the camera body 10.

[16] The camera according to the embodiments is the camera described in [1] above. The movable unit 30 is provided on the side of the camera body 10 to move rotationally the image display unit 20 on the axis vertical to the bottom 10d of the camera body 10.

In the above camera, the image display unit 20 is moved in the horizontal direction of the camera body 10, and even if the camera body 10 is fixed to a tripod, movement of the image display unit 20 will not be disturbed by the surrounding members.

[17] The camera according to the embodiments is the camera described in [16] above. The movable unit 30 comprises a first connection member 301 whose one end is pivotally fixed to the camera body 10 to be movable rotationally on an axis vertical to the bottom 10d of the camera 10, and a second connection member 302 whose one end is pivotally fixed to the other end of the connection member 301 to be movable rotationally on an axis vertical to the bottom 10d of the camera body 10. The second connection member 302 has at the other end a unit CX1 which pivotally fixes the image display unit 20 to be movable rotationally on an axis parallel to the bottom 10d of the camera body 10.

In the above camera, since the image display unit 20 is moved rotationally also in the vertical direction, as well as, in the horizontal direction, low-angle and high-angle photography are easy.

[18] The camera system according to the embodiments is a camera system CS comprising a camera 40, and an accessory (a camera stand) 50 which permits mounting of the camera 40 and makes electrical connection with the camera 40 when it is mounted.

The above camera 40 comprises a camera body 10, a photographing lens 11 provided on the front side of the camera body 10, an image display unit 20 which displays images taken through the photographing lens 11, and a movable unit 30 which moves the image display unit 20 between the front position and rear position of the camera body 10 through a connection member 31 whose one end is pivotally fixed to the camera body 10, and the other end is pivotally fixed to the image display unit 20.

The connection member 31 in the movable unit 30 has a connection unit (a connector 32) of the camera 40 which is connected to the accessory (camera stand) 50.

[19] The camera according to the embodiments comprises a camera body 10, a photographing lens 11 provided on the front side of the camera body 10, an image display unit 20 which displays images taken through the photographing lens 11, and a movable unit 30 which moves the image display unit 20 between the front position on the front side and rear position on the rear side of the camera body 10. The movable unit 30 is provided at the bottom of the camera body 10.

[20] The camera according to the embodiments is the camera described in [16] above. The movable unit 30 is provided rotationally movable on the axes (AX1 and AX2) parallel to the width direction of the camera body 10, and has a connection member 31 whose one end is pivotally fixed to the camera body 10 and the other end is pivotally fixed to the image display unit 20.

Namely, as described above, the image display unit 20 is placed at the rear position of the camera body 10 upon normal photographing. Therefore, the camera can be used in compact states as in the prior art. It is also possible to change the camera positions desirably according to the photographer's position. Therefore, monitored photographing by monitoring a displayed image is possible, regardless of a photographer's position. While the camera is not used, the display panel of the image display unit is housed just like covering the photographing lens from the outside. This eliminates the necessity of a dedicated lens barrier, and contributes to miniaturization of the camera.

The camera of this embodiment has advantages that a dedicated lens barrier is unnecessary, the size is miniaturized, and photographing is possible in the compact state as in the prior art.

Third Embodiment

Figure 16A:
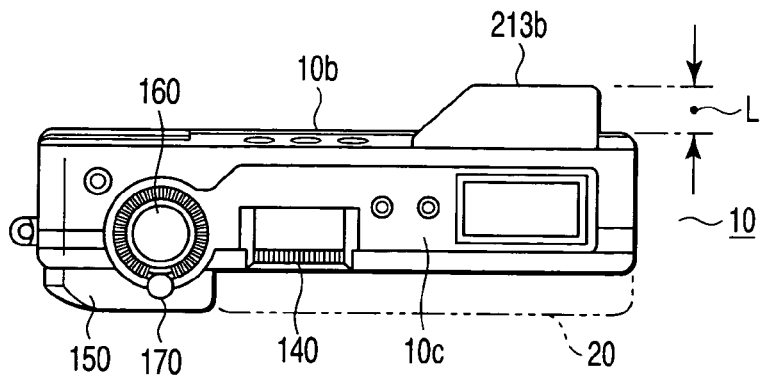
FIGS. 16A to 16C are views showing the configurations of a camera according to a third embodiment.
Figure 16B:
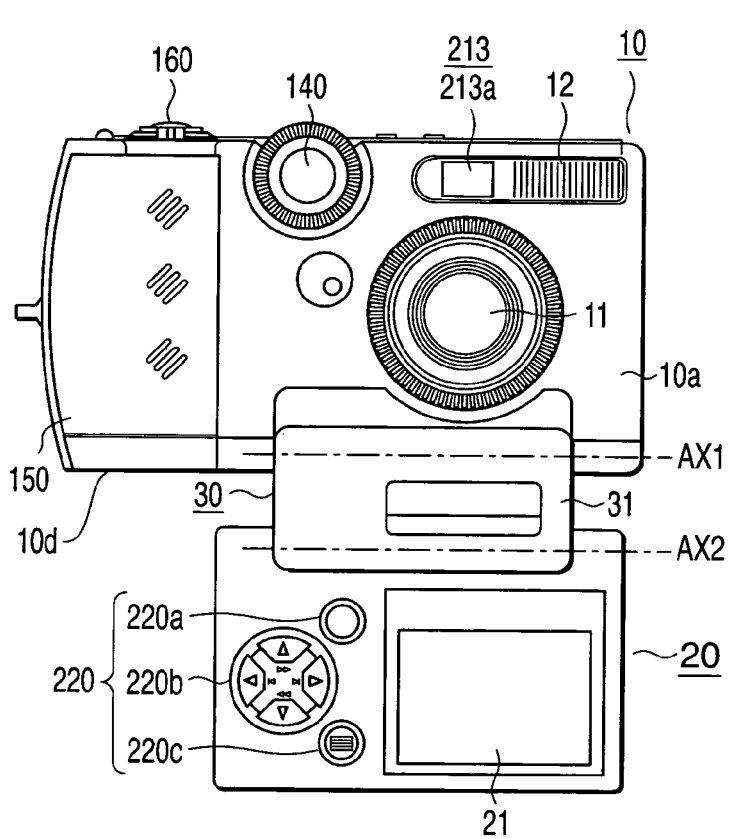
Figure 16C:
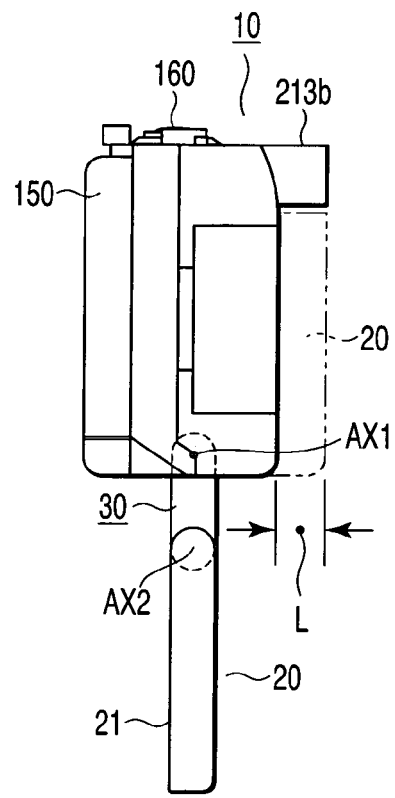

FIGS. 16A to 16C show the configurations of a camera according to a third embodiment in the state that an image display unit 20 is moved downward from the front position of the camera body. FIG. 16A is a top view of the camera body 10. FIG. 16B is a front view of the camera body 10. FIG. 16C is a right side view of the camera body 10 seen from the front side. In the following description, the left and right sides of the camera indicate the sides seen from the front side of the camera body.

Figure 17:
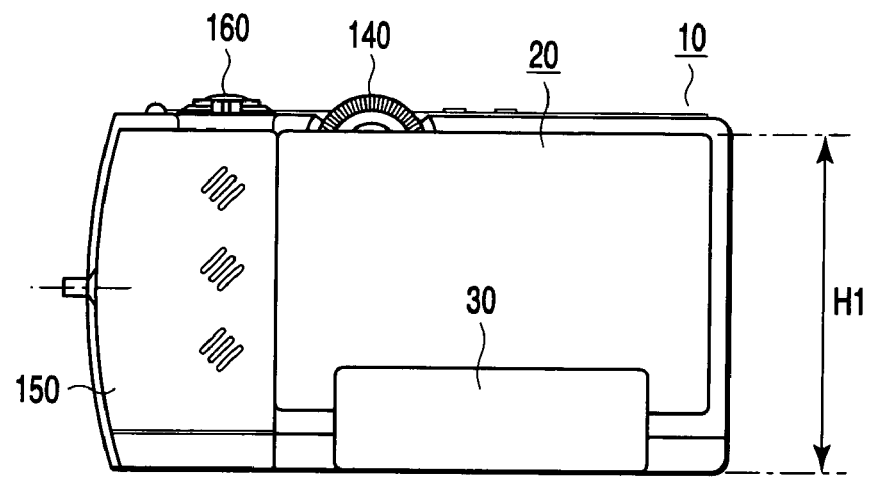
FIG. 17 is a front view showing the configuration of the camera according to the third embodiment.

FIG. 17 is a front view showing the state that the image display unit 20 according to the third embodiment is placed at the front position of the camera body 10.

Figure 18:
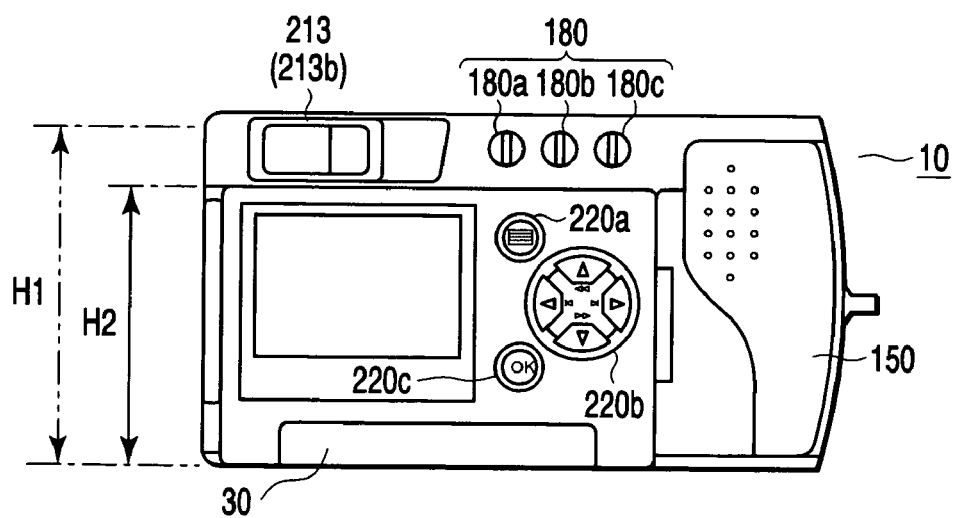
FIG. 18 is a rear view showing the configuration of the camera according to the third embodiment.

FIG. 18 is a rear view showing the state that the image display unit 20 according to the third embodiment is placed at the rear position of the camera body 10.

The system configuration of the camera of this embodiment is the same as that of the camera of the first embodiment shown in FIG. 9.

(Configuration of the Camera)

The camera body 10 according to this embodiment is a digital camera, which has a collapsible mount type photographing lens 11 at the center of the front side 10a as shown in FIGS. 16A and 16B. A strobe (flash) light 12 is provided in the upper right of the photographing lens 10.

An entrance window 213a of a finder 213 is provided in the upper part of the photographing lens 11. A camera mode selector dial 140 is provided in the upper left of the photographing lens 11. The left end portion of the front side 10a of the camera body is formed as a so-called grip 150 to be gripped by a photographer upon photographing. On the upper side 10c of the camera body 10, a release button 160 and a zoom rotation lever 170 are arranged. The broken lines indicate the image display unit 20 located at the front position. On the rear side 10b of the camera body 10, control buttons 180 (180a-180c) and the eyepiece 213b of the finder 213 are arranged as shown in FIG. 18.

The image display unit 20 is provided to be able to display images taken through the photographing lens 11 as monitor images on a display panel 21. On the same side of the display panel 21 of the image display unit 20, control members 220 (220a-220c) including a display button to display images upside down are arranged.

The image display unit 20 is moved between the preset front position on the front side of the camera body and the preset rear position on the rear side of the camera body 10, by the movable unit 30 provided at the bottom 10d of the camera body 10.

When the image display unit 20 is moved to the front position of the camera body 10 as shown in FIG. 17, the display panel 21 is placed opposite to the front side 10a of the camera body 10 just like covering the photographing lens 11 and finder entrance window 213a. In this state, the image display unit 20 serves as a lens barrier.

When the image display unit 20 is moved to the rear position of the camera body 10 as shown in FIG. 18, the display panel 21 is exposed while an eyepiece 213b is kept exposed. In this state, the image display unit 20 can serve as an image check monitor in normal photography.

As shown in FIGS. 16A to 16C, the movable unit 30 has a rectangular parallelepiped connection member 31 which pivotally connects the image display unit 20 to the camera body 10. The connection member 31 has first and second pivot axes AX1 and AX2 parallel to the width direction of the camera body 10 at one end and the other end, respectively. One end of the connection member 31 is pivotally fixed to the bottom of the camera body 10 through the axis AX1.

The proximal end of the image display unit 20 is pivotally fixed to the other end of the connection member 31 through the axis AX2. The image display unit 20 is moved by the movable unit 30 in a substantially 360° wide angle range between the front position and rear position of the camera body 10 through the bottom 10d of the camera body 10.

In proximity to the first axis AX1, a first encoder is provided to detect the rotation angle α of the connection member 31 to the camera body 10. In proximity to the second axis AX2, a second encoder is provided to detect the rotation angle β of the image display unit 20 to the connection member 31.

As shown in FIGS. 17 and 18, the movable unit 30 includes a unit which sets the height of the upper end of the image display unit 20 from the camera bottom, so that the height (H2) of the unit 20 placed at the rear position of the camera body 10 is lower than the height (H1) when the unit 20 is at the front position of the camera body 10.

The eyepiece 213b of the finder 213 is provided so that the viewing surface of the eyepiece 213b is projected by a length L from the rear side of the camera body 10. When the image display unit 20 is moved to the rear position, the upper end surface of the unit 20 comes close to the bottom of the eyepiece 213b and the outside surface of the unit 20 and the viewing surface of the eyepiece become the same surface (with the same projection length L) in the depth direction of the camera body 10.

The left end of the image display unit 20 placed at the front position of the camera body 10 is set to be continuous in appearance with the right end of the grip 150 provided at the left end of the camera body 10.

Figure 19:
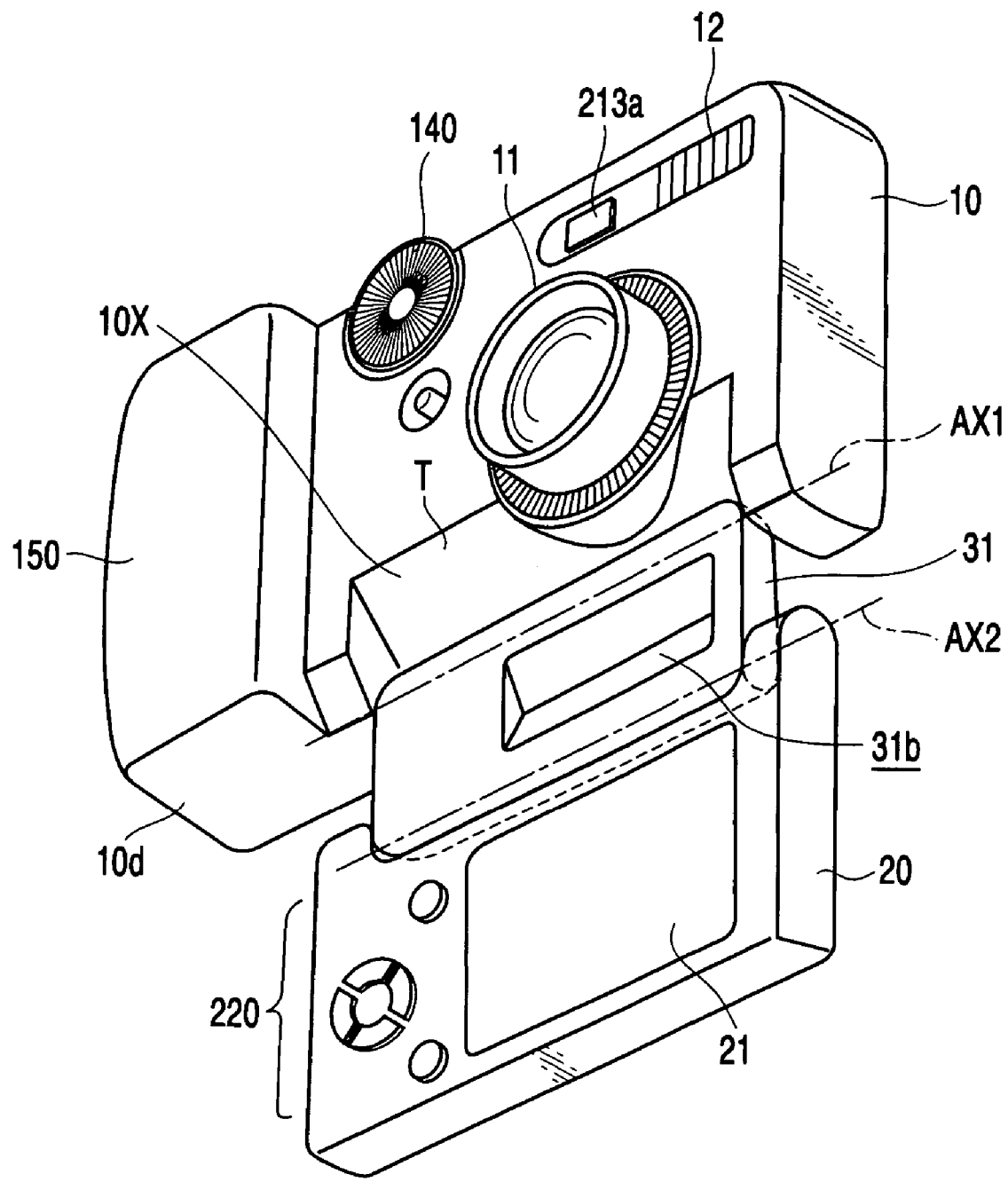
FIG. 19 is an external view of the camera according to the third embodiment.

As shown in FIG. 19, a connection member housing 10X is formed at the bottom of the camera body 10. The connection member housing 10X has a slope T to permit contact of the inside of the connection member 31 when the image display unit 20 is placed at the front position of the camera body 10. At substantially the center of the inside of the connection member 31, a V-shaped groove 31b is formed to contain the projecting portion the cover that protects the photographing lens 11.

Figure 20:
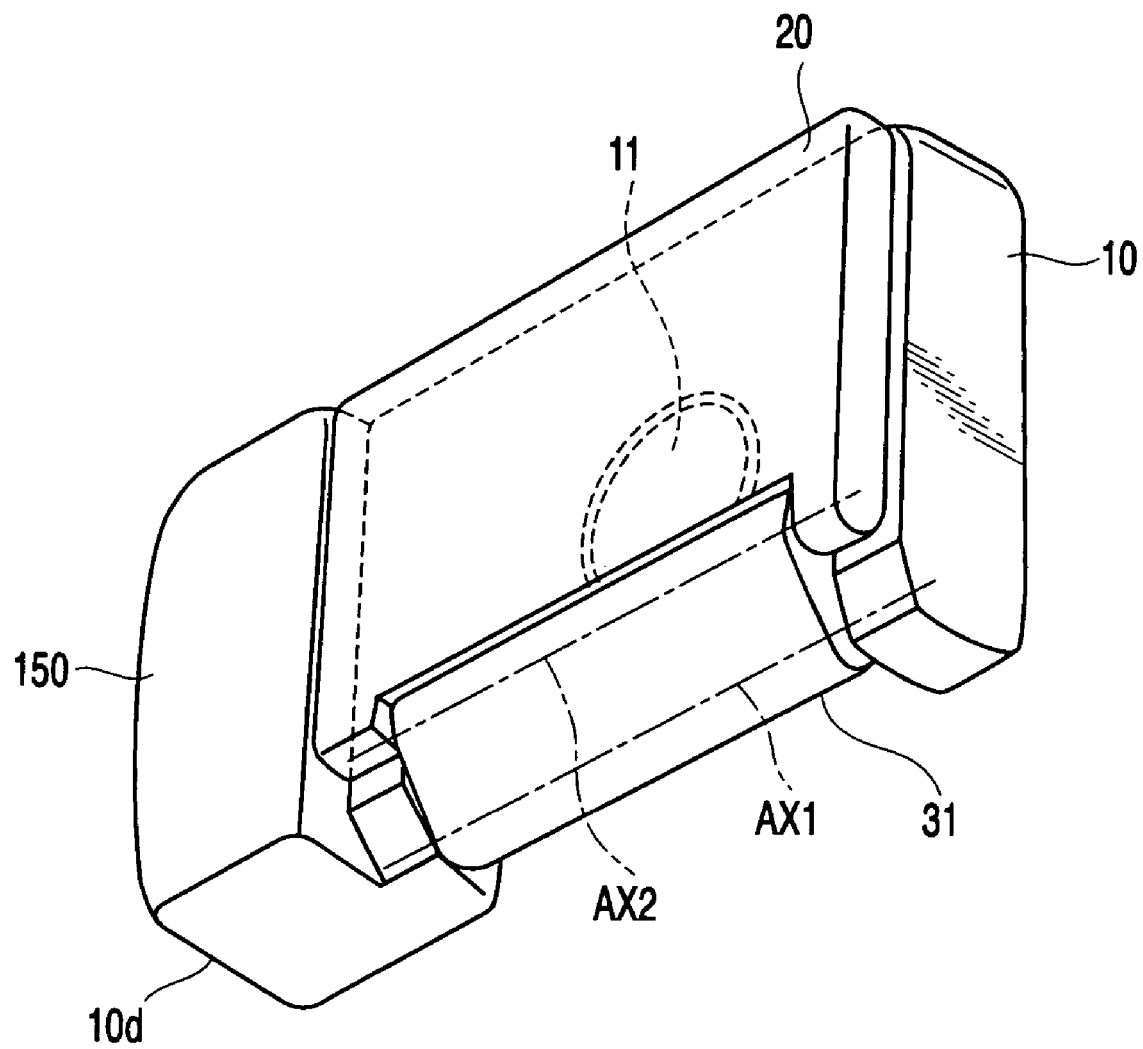
FIG. 20 is an external view of the camera according to the third embodiment.

Further, as shown in FIG. 20, when the image display unit 20 is placed at the front position of the camera body 10, the outside surface of the connection member 31 is inclined to the camera bottom 10d.

Figures 22A, 22B:
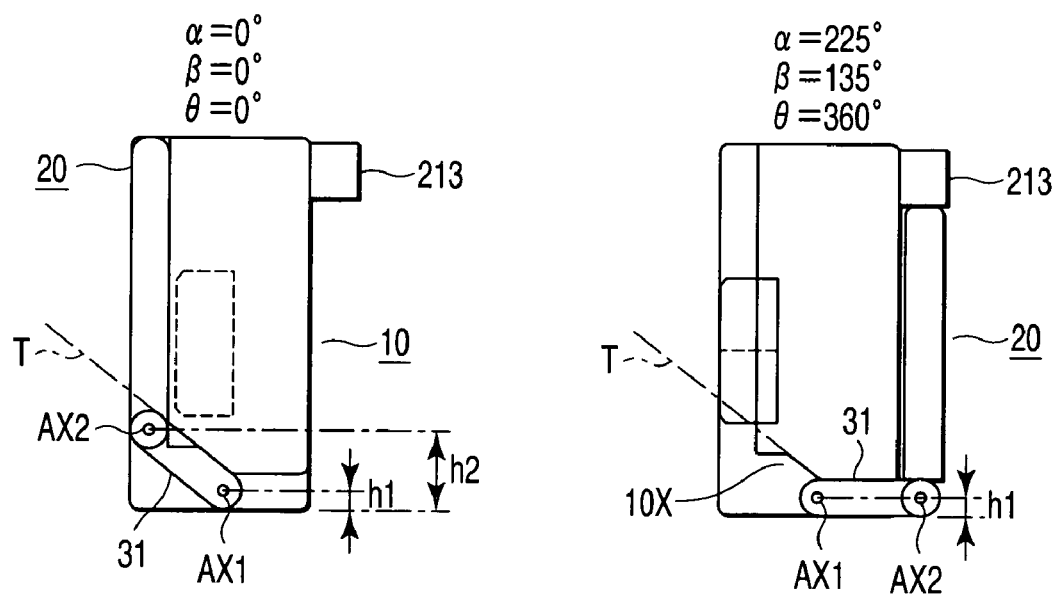
FIGS. 22A and 22B are side views of the camera body according to the third embodiment.

When the image display unit 20 is placed at the rear position of the camera body 10, the heights of the first pivot axis AX1 and second pivot axis AX2 of the connection member 31 from the camera bottom 10d become substantially the same (refer to FIG. 22B).

When the image display unit 20 is placed at the front position of the camera body 10, the height h2 of the second pivot axis AX2 from the camera bottom is higher than the height h1 of the first pivot axis AX1 from the camera bottom 10d (refer to FIG. 22A).

(Movement of the Image Display Unit 20)

Now, description will be given on the relative movement of the image display unit 20 to the camera body 10 in the camera according to the third embodiment. For simplicity of description, the positions (rotation angles) of the image display unit 20 to the camera body 10 will be defined in advance as follows.

Figure 21:
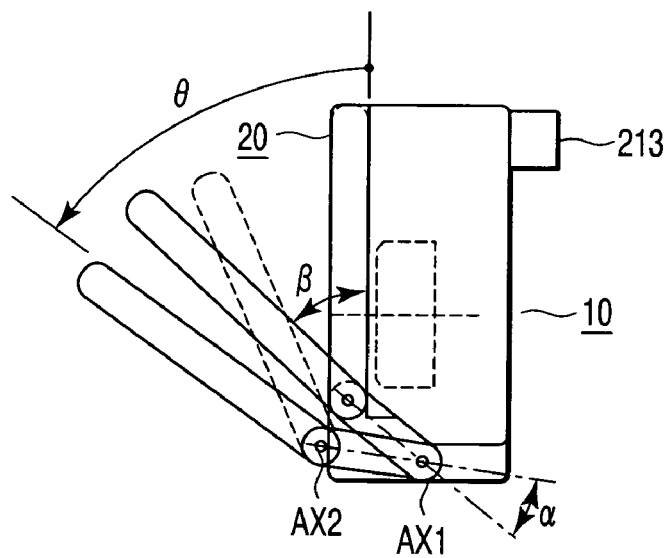
FIG. 21 is a view for explaining the positions of the image display unit with respect to the camera body according to the third embodiment.

FIG. 21 is a view for definition of the positions (rotation angles) of the image display unit 20 to the camera body 10.

(1) The counterclockwise direction indicated by an arrow in the drawing is a "+" rotation direction.

(2) The relative movement angle of the connection member 31 to the camera body 10 is $\alpha$. When the connection member 31 contacts the slope T of the connection member housing 10X of the camera body 10, the angle $\alpha=0°$.

(3) The relative movement angle of the image display unit 20 to the connection member 31 is $\beta$. When the image display unit 20 contacts the front side of the camera body 10 with $\alpha=0°$, the angle $\beta=0°$.

(4) The relative movement angle of the image display unit 20 to the front side of the camera body 10 is $\theta$. Therefore, $\theta=\alpha+\beta$.

FIGS. 22A and 22B are side views showing the states that the image display unit 20 contacts the front side and rear side of the camera body 10, respectively. The state of FIG. 22A is expressed by $\alpha=0°$, $\beta=0°$ and $\theta=0°$ according to the above definition. The state of FIG. 7(b) is expressed by $\alpha=225°$, $\beta=135°$ and $\theta=360°$ according to the above definition.

Figures 23A, 23B:
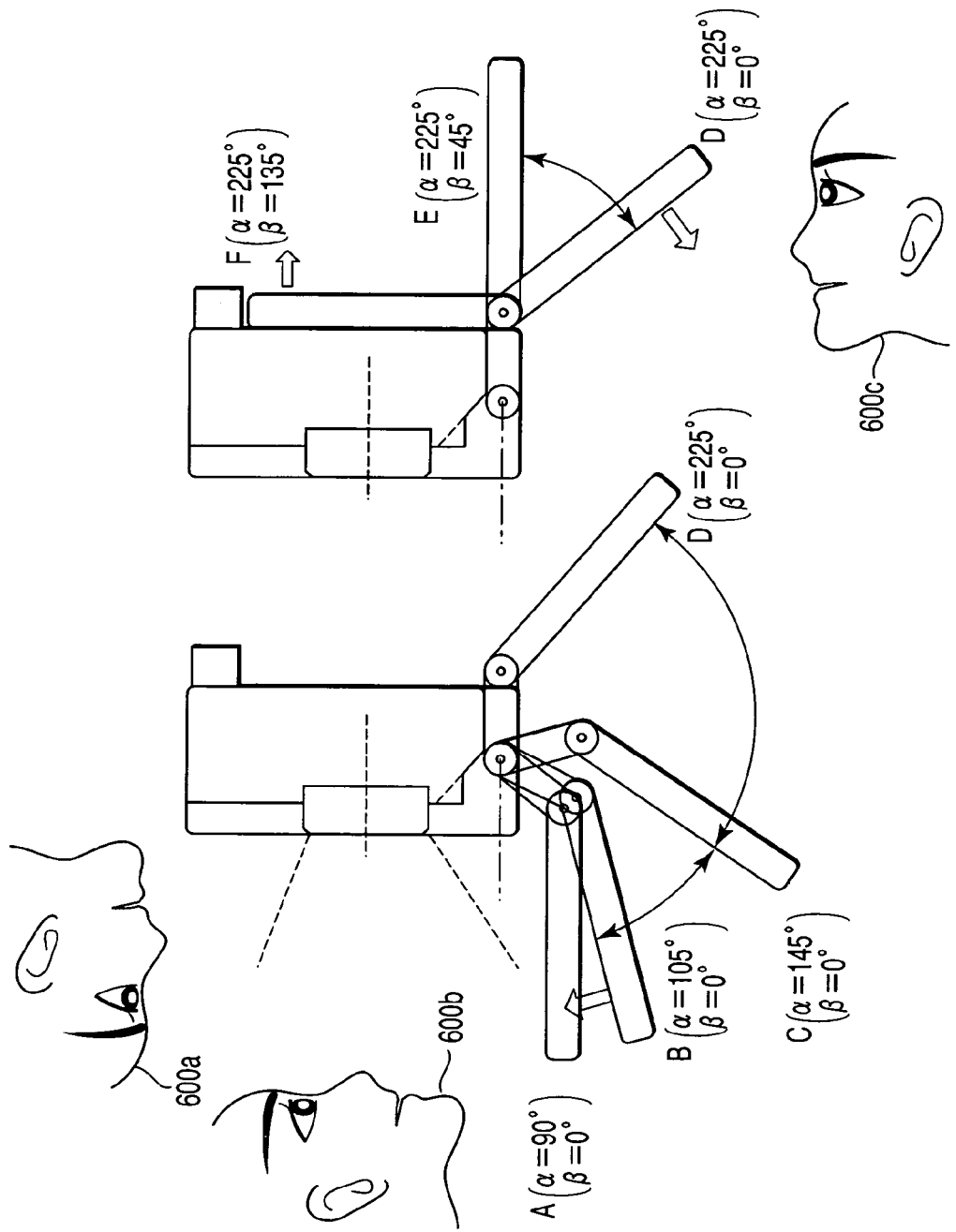
FIGS. 23A and 23B are views showing the states of the image display unit upon photographing with the camera according to the third embodiment.

FIGS. 23A and 23B are views showing the states of the camera upon photographing including the relative movement of the image display unit 20. Thick arrows shown in FIG. 23A and 23B indicate the display panel 21.

FIG. 23A is a view showing the state that only the connection member 31 is rotated in the "+" direction in the state that the relative movement angle $\beta$ of the image display unit 20 to the connection member 31 is fixed to $\beta=0°$.

In the state A ($\alpha=90°$ and $\beta=0°$), the image display unit 20 is moved 45° from the front position of the camera body 10 to the first position, and the lens can be driven out. Therefore, the angle of the image display unit 20 in this state is defined as a lens drive-out permit angle.

In the state B ($\alpha=105°$ and $\beta=0°$), the image display unit 20 is moved further from the first position, the image display unit 20 is moved out of the photographing angle range, and photography is possible. Therefore, the angle of the image display unit 20 in this state is defined as a photographing permit angle.

In the state C ($\alpha=145°$ and $\beta=0°$), the image display unit 20 is moved 145° downward at the front of the camera body 10. The range from the state B ($\alpha=105°$ and $\beta=0°$) to C ($\alpha=145°$ and $\beta=0°$ is the angles suitable for so-called low-angle photography in which a photographer takes a picture in the position just like viewing the camera body 10 from the top as shown by 600a. Therefore, this angle range is defined as a low-angle photographing range.

In the state D ($\alpha=225°$ and $\beta=0°$), the image display unit 20 is moved downward obliquely at the rear of the camera body 10. The range from the state C ($\alpha=145°$ and $\beta=0°$) to D ($\alpha=225°$ and $\beta=0°$) is the angles suitable for so-called self-portrait in which a photographer takes a self-portrait from the front side of the camera body 10 as shown by 600b. Therefore, this angle range is defined as a self-portrait range. The state D indicates the limit of movement in the "+" direction of the connection member 31 against the camera body 10.

FIG. 23B is a view showing the state that only the image display unit 20 is moved in the "+" direction in the state that the relative movement angle $\alpha$ of the connection member 31 to the camera body is fixed to $\alpha=225°$.

The state D ($\alpha=225°$ and $\beta=0°$) is the same as the state D shown in FIG. 23A.

In the state E ($\alpha=225°$ and $\beta=45°$), the image display unit 20 is moved 45° against the connection member 31. The range from the state D ($\alpha=225°$ and $\beta=0°$) to E (($\alpha=225°$ and $\beta=45°$) is the angles suitable for high-angle photography in which a photographer takes a picture in the position of viewing the camera body 10 from the bottom as shown by 600c. Therefore, this angle range is defined as a high-angle photographing range.

In the state F (($\alpha=225°$ and $\beta=135°$), the image display unit 20 is moved 135° against the connection member 31 and the image display unit 20 contacts the rear side of the camera. This state is the angles suitable for normal photography. Therefore, this angle is defined as a normal photographing angle.

FIG. 24 is a flowchart showing the procedure of the control operations by the control unit 120X. Explanation will be given on each step.

Step ST21: Whether $\alpha$ is over 90° and $\theta$ is over 90° are confirmed. If NO, a standby state is held. If YES, go to step ST22.

Step ST22: The main power supply is turned on. Go to step ST23.

Step ST23: The lens drive-out permit angle is set, and the photographing lens 11 is driven. Go to step ST24.

Step ST24: Whether $\alpha$ is over 105° and $\theta$ is over 105° are confirmed. If NO, a standby state is held. If YES, go to step ST25.

Step ST25: The photographing/playback permit angle is set, and photographing or playback is executed.

Step ST26: Whether photographing mode is set is determined. If setting of photographing mode is confirmed, go to step ST27.

Step ST27: Whether the self-portrait range is set is determined. If setting of self-portrait range is confirmed, go to step ST28. If setting of self-portrait range is not confirmed, go to step ST30.

Step ST28: Self-portrait display is set. Namely, the direction of a display image displayed in the image display unit 20 is made upside down, or mirror images are reversed. Thereafter, the camera takes a picture every time the user pushes the release button 160.

Step ST29: If setting of photographing mode is not confirmed in step ST26, playback is performed. After the end of playback, go to step ST30.

Step ST30: Whether α is over 105° and θ is over 105° are confirmed. If YES, return to step ST26. If NO, the end of photographing is confirmed. Go to step ST31.

Step ST31: The photographing lens is retracted. Go to step ST32.

Step ST32: The main power supply is turned off, and a series of control operations is finished.

Characteristics in the Third Embodiment

[1] The camera according to the third embodiment comprises a camera body 10, a photographing lens 11 provided on the front side 10*a* of the camera body 10, a subject check finder 213 (either optical or electrical) having an eyepiece 213*b* provided on the rear side 10*b* of the camera body 10, an image display unit 20 which displays images taken through the photographing lens 11, and a movable unit 30 which moves the image display unit 20 between the front position set on the front side of the camera body 10 and the rear position set on the rear side.

The image display unit 20 is set so that the display panel 21 is faced to the front side of the camera body 10 just like covering the photographing lens 11 when moved to the front position, and the display panel 21 is exposed in the state that the eyepiece 212*b* is exposed when moved to the rear position.

In the above camera, the image display unit 20 is used as a barrier member to protect the photographing lens 11 and finder entrance window 213*a*, and a dedicated barrier member is unnecessary. This contributes miniaturization of the camera. Further, in normal photography, the image display unit 20 is set to a position not disturbing the subject check finder 212 on the rear side of the camera body 10. This permits use of the camera in compact states as in the prior art.

[2] The camera according to the embodiment is the camera described in [1] above. The movable unit 30 includes a unit which rotationally moves the image display unit 20 in an angle range of 360° between the front position and rear position, and sets the height of the upper end surface of the image display unit 20 from the camera bottom so that the height (H2) when the unit 20 is placed at the rear position of the camera body 10 is lower than the height (H1) when the unit 20 is placed at the front position of the camera body 10.

In the above camera, when the image display unit 20 is placed at the rear position of the camera body 10, the camera is placed at a relatively low position. This makes it easy to take a space to provide the finder eyepiece 213*b*, and the viewing surface of the eyepiece 213*b* can be securely exposed.

[3] The camera according to the embodiment is the camera described in [1] above.

The eyepiece 213*b* of the finder 213 is provided so that the viewing surface of the eyepiece 213*b* is projected from the rear side of the camera body 10. The image display unit 20 is set so that when moved to the rear position, the upper end surface of the unit 20 comes close to the bottom of the eyepiece 213*b*, and the outside surface of the unit 20 and the viewing surface of the eyepiece become the same in the depth direction of the camera body 10.

In the above camera, the display panel of the image display unit 20 and the viewing surface of the eyepiece 213*b* do not disturb each other when a photographer views them. This makes it smooth to confirm a photographing image.

[4] The camera according to the embodiment is the camera described in [1] above. The finder 213 is an optical finder having an entrance window 213*a* on the front side of the camera body 10. The image display unit 20 is placed to cover the entrance window 13*a* of the finder 213 at the front position of the camera body 10.

In the above camera, the finder entrance window 213*a* is securely protected by the image display unit 20 which serves as a barrier while the camera is carried. This prevents damages or breakage of the entrance window.

[5] The camera according to the embodiment is the camera described in [1] above. The outside surface of the image display unit 20 placed at the front position of the camera body 10 becomes continuous with the outside surface of the grip 150 provided on the side of the camera body 10.

In the above camera, there is no level difference in the boundary of the grip 150 and the outside surface of the image display unit 20. Therefore, the boundary will not disturb the surrounding parts while the camera is carried.

[6] The camera according to the embodiment is the camera described in [1] above. The movable unit 30 is provided at the bottom of the camera body 10.

In the above camera, the movable unit 30 is provided at the bottom of the camera body 10, and designing is easy.

[7] The camera according to the embodiment is the camera described in [6] above. The movable unit 30 has a connection member 31 which connects the camera body 10 to the image display unit 20. The connection member 31 has in one end a first pivot axis AX1 which is pivotally fixed to the camera body 10, and at the other end a second pivot axis AX2 which is pivotally fixes the image display unit 20.

[8] The camera according to the embodiment is the camera described in [7] above. The connection member 31 is set so that the heights h1 and h2 of the first and second pivot axes AX1 and AX2 from the camera bottom 10*d* become substantially the same when the image display unit 20 is placed at the rear position of the camera body 10, and the height h2 of the second pivot axis AX2 from the camera bottom is higher than the height h1 of the first pivot axis AX1 from the camera bottom when the image display unit 20 is placed at the front position of the camera body 10.

[9] The camera according to the embodiment is the camera described in [8] above. The camera is characterized by a connection member housing 10X which includes a tilt T to permit contact of the connection member 31 when the image display unit 20 is placed at the front position of the camera body 10, is formed at the bottom of the camera body 10.

As described above, in ordinary photography, the image display unit of this embodiment is placed at a position not disturbing the subject check finder provided at the rear side of the camera body. This permits use of the camera in compact states as in the prior art. It is also possible to change the camera positions desirably according to the photographer's position. Therefore, monitored photographing by monitoring a displayed image is possible, regardless of the photographer's position. While the camera is not used, the display panel of the image display unit is housed just like covering the photographing lens and finder entrance window from the outside. This eliminates the necessity of a dedicated lens barrier, and contributes to miniaturization of the camera.

Therefore, the invention can stably provide a camera, which permits monitored photographing by monitoring a displayed image regardless of the photographer's position, eliminates the necessity of a dedicated barrier member, miniaturizes the size of camera, and allows use of camera in compact states as in the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
   a camera body;
   a photographing lens provided on the front side of the camera body;
   an image display unit which displays images taken through the photographing lens; and
   a movable unit which moves the image display unit between the front position on the front side of the camera body and the rear position on the rear side,
   wherein the image display unit is so disposed as to oppose a display panel against the front side of the camera body and cover the photographing lens when moved to the front position, and the image display unit exposes the photographing lens when moved to the rear position,
   wherein the movable unit is provided at the bottom of the camera body and has a connection unit for connecting the camera body electrically to an accessory which is to be added to the camera body, and
   wherein the connection unit is so provided on the surface of the camera body as to be covered when the image display unit is at the front position, and exposed when the image display unit is at the rear position.

2. The digital camera according to claim 1, wherein
   a grip unit is so provided on the side of the camera body as to project toward the side of an object,
   wherein the image display unit is, when at the front position, accommodated in the portion on the front side of the camera body except in a projected portion of the grip unit, thereby making the entire front face of the camera substantially flat, and
   wherein the front face of the camera becomes capable of being gripped, with the grip unit being projected, when the image display unit is moved from the front position to the rear position of the camera body.

3. The digital camera according to claim 1, wherein the movable unit moves rotationally the image display unit in an angle range of approximately 360° between the front position and rear position, and sets the height of the upper end surface of the image display unit from the bottom of the camera body becomes substantially the same at the front and rear positions of the camera body.

4. The digital camera according to claim 1, wherein the movable unit has a unit, which rotationally moves the image display unit in an angle range of approximately 360° between the front position and rear position, and sets the upper end surface of the image display unit to be continuous with the upper surface of the camera body in appearance at either front or rear position of the camera body.

5. The digital camera according to claim 1, wherein the movable unit has a unit which rotationally moves the image display unit in an angle range of approximately 360° between the front position and rear position through the bottom of the camera body.

6. The digital camera according to claim 1, wherein the movable unit has a connection member, which is provided rotationally movable on axes parallel to the width direction of the camera body, and whose one end is pivotally fixed to the camera body and the other end is pivotally fixed to the image display unit.

7. The digital camera according to claim 6, wherein the connection unit is provided on one side of the connection member which is opposed to the bottom of the camera body when the image display unit is at the front position, and exposed outside the camera body when the image display unit is at the rear position.

8. The digital camera according to claim 1, further comprising a control unit which controls the operations of the camera body according to the position of the image display unit changed by the movable unit.

9. The digital camera according to claim 8, wherein the control unit controls the driving of the photographing lens to the camera body according to the position of the image display unit.

10. The digital camera according to claim 8, wherein the control unit changes and controls the direction of an image displayed on the image display unit, according to the positions of the image display unit.

11. The digital camera according to claim 8, wherein the control unit includes a detection unit which detects the position of the image display unit based on the rotation angle of the connection member to the camera body, and the rotation angle of the image display unit to the connection member, and a unit which controls the camera operations of the camera body according to the position detected by the detection unit.

12. The digital camera according to claim 1, further comprising control members arranged on the same side as the display panel of the image display unit.

13. The digital camera according to claim 1, wherein the movable unit is provided on the side of the camera body to move the image display unit rotationally above an axis vertical to the bottom of the camera body.

14. The digital camera according to claim 13, wherein the movable unit has a first connection member whose one end is pivotally fixed to the camera body to be movable rotationally above an axis vertical to the bottom of the camera, and a second connection member whose one end is pivotally fixed to the other end of the connection member to be movable rotationally above an axis vertical to the bottom of the camera body; and the second connection member has at the other end a unit which pivotally fixes the image display unit to be movable rotationally above an axis parallel to the bottom of the camera body.

15. The digital camera according to claim 1, wherein
   a subject check finder having an eyepiece provided on the rear side of the camera body
   and the image display unit are so disposed as to expose the display panel and the eyepiece when the image display unit is moved to the rear position.

16. The digital camera according to claim 15, wherein the movable unit includes a unit which rotationally moves the image display unit in an angle range of approximately 360° between the front position and rear position, and sets the height of the upper end surface of the image display unit from the camera bottom so that the height when the image display unit is placed at the rear position of the camera body is lower than the height when the image display unit is placed at the front position of the camera body.

17. The digital camera according to claim 16, wherein the eyepiece of the finder is provided so that the viewing surface of the eyepiece is projected from the rear side of the camera body;
   the image display unit is set so that when moved to the rear position, the upper end surface of the unit comes close to the bottom of the eyepiece, and the outside surface of the unit and the viewing surface of the eyepiece become the same in the depth direction of the camera body.

18. The digital camera according to claim 15, wherein the finder is an optical finder having an entrance window on the front side of the camera body; and the image display unit is placed to cover the entrance window of the finder at the front position of the camera body.

19. The digital camera according to claim 15, wherein the outside surface of the image display unit placed at the front position of the camera body becomes continuous with the outside surface of a grip unit provided on the side of the camera body.

20. The digital camera according to claim 15, wherein the movable unit is provided at the bottom of the camera body.

21. The digital camera according to claim 20, wherein the movable unit has a connection member which connects the camera body to the image display unit; and the connection member has in one end a first pivot axis which is pivotally fixed to the camera body, and at the other end a second pivot axis which pivotally fixes the image display unit.

22. The digital camera according to claim 21, wherein the connection member is set so that the heights of the first and second pivot axes from the camera bottom become substantially the same when the image display unit is placed at the rear position of the camera body, and the height of the second pivot axis from the camera bottom is higher than the height of the first pivot axis from the camera bottom when the image display unit is placed at the front position of the camera body.

23. The digital camera according to claim 22, further comprising a connection member housing which includes a tilt to permit contact of the connection member when the image display unit is placed at the front position of the camera body, and which is formed at the bottom of the camera body.

24. The digital camera according to claim 1,
wherein the camera body has a top portion and a bottom portion opposite the top portion,
wherein the movable unit having the connection unit is located on the bottom portion of the camera body, and
wherein a shutter release button is provided on the top portion the camera body.

* * * * *